US011811523B2

(12) United States Patent
Martin et al.

(10) Patent No.: US 11,811,523 B2
(45) Date of Patent: Nov. 7, 2023

(54) DEVICE-SIDE VALIDATION OF SCREEN RECORDINGS

(71) Applicant: Measure Protocol Limited, London (GB)

(72) Inventors: John Martin, Jacksonville, FL (US); Sunil Mehta, Mountain View, CA (US)

(73) Assignee: Measure Protocol Limited

( * ) Notice: Subject to any disclaimer, the term of this patent is extended or adjusted under 35 U.S.C. 154(b) by 98 days.

(21) Appl. No.: 17/346,040

(22) Filed: Jun. 11, 2021

(65) Prior Publication Data

US 2022/0400157 A1 Dec. 15, 2022

(51) Int. Cl.
| | | |
|---|---|---|
| *H04L 67/50* | (2022.01) | |
| *G06V 10/22* | (2022.01) | |
| *G06F 11/34* | (2006.01) | |
| *H04L 9/40* | (2022.01) | |
| *G06V 30/10* | (2022.01) | |

(52) U.S. Cl.
CPC ........ *H04L 67/535* (2022.05); *G06F 11/3438* (2013.01); *G06V 10/225* (2022.01); *H04L 63/101* (2013.01); *G06V 30/10* (2022.01)

(58) Field of Classification Search
CPC ..... H04L 63/083; H04L 67/535; H04L 65/75; G06F 2221/2139; H04N 21/23418; H04N 21/222
See application file for complete search history.

(56) References Cited

U.S. PATENT DOCUMENTS

| | | | |
|---|---|---|---|
| 2006/0257048 A1 | 11/2006 | Lin | |
| 2013/0188865 A1 | 7/2013 | Saha | |
| 2014/0366052 A1* | 12/2014 | Ives | H04N 21/234336 725/19 |
| 2015/0149293 A1 | 5/2015 | Xiong | |
| 2015/0220814 A1 | 8/2015 | Verkasalo | |
| 2016/0359990 A1* | 12/2016 | Dabbiere | H04L 63/083 |
| 2018/0336617 A1 | 11/2018 | Baxter | |
| 2021/0027279 A1* | 1/2021 | Hammad | G06Q 20/351 |
| 2021/0056311 A1 | 2/2021 | Latham | |
| 2021/0342216 A1* | 11/2021 | Dines | G06F 11/0772 |

FOREIGN PATENT DOCUMENTS

CN 110851148 2/2020

OTHER PUBLICATIONS

Kreiter et al. "Analyzing mobile application usage : generating log files from mobile screen recordings", Proceedings of the 20th International Conference on Human-Computer Interaction With Mobile Devices and Services, MobileHCI 18, Sep. 3, 2018, pp. 1-10, DOI: 10.1145/3229434.3229450, ISBN: 978-1-4503-5898-9.

* cited by examiner

*Primary Examiner* — Mahran Y Abu Roumi
(74) *Attorney, Agent, or Firm* — Van Pelt, Yi & James LLP

(57) ABSTRACT

Device-side validation of screen recordings is disclosed, including: accessing a screen recording of a user's activities on a client device with respect to a task; performing, at the client device, video validation on the screen recording, including by identifying a characteristic marker associated with the task within the screen recording; and in response to the characteristic marker being identified, sending at least a portion of the screen recording to a compressed version of the screen recording to a server for further processing.

16 Claims, 17 Drawing Sheets

DEVICE-SIDE VALIDATION OF SCREEN RECORDINGS

BACKGROUND OF THE INVENTION

Data pertaining to users' behavior is valuable to collect for market research. As more user activity is carried out online, how users interact with websites can be monitored to collect user behavior data. One conventional technique of monitoring a user's online behavior is to use a virtual private network (VPN) to track the inbound and outbound internet traffic from the user's device. There are several deficiencies with respect to using a VPN to monitor internet traffic. The first deficiency is that the monitored internet traffic may include sensitive data that should not be collected in consideration of the user's privacy concerns. The second deficiency is that not all operating systems permit the use of the VPN and as such, VPN-based traffic monitoring would exclude data of users of those operating systems. The third deficiency is that VPN-based traffic monitoring cannot track user actions at the device that do not result in a network request. The fourth deficiency is typically the monitored traffic is not parsed until after a certain amount of traffic has been monitored and/or an observation period has passed, which results in an inefficient user data collection process. Given the various drawbacks to the VPN-based technique for collecting user behavior, a more efficient and secure way to collect user behavior data is desirable.

BRIEF DESCRIPTION OF THE DRAWINGS

Various embodiments of the invention are disclosed in the following detailed description and the accompanying drawings.

DETAILED DESCRIPTION

Figure 1:
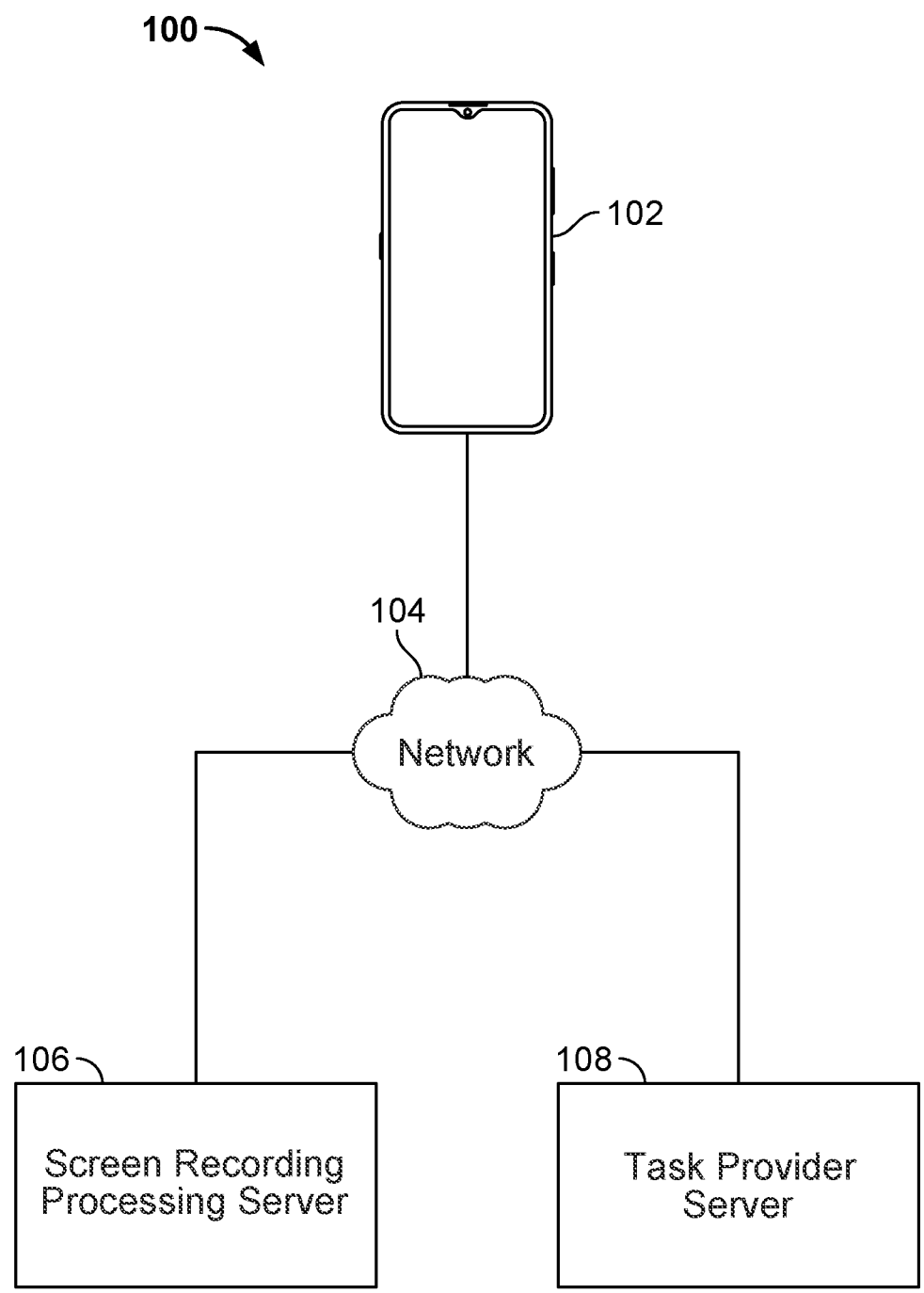
FIG. 1 is a diagram showing an embodiment of a system for generating screen recordings and generating structured data from screen recordings.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of device-side validation of screen recordings are described herein. A screen recording of a user's activities on a client device with respect to a task is accessed. In various embodiments, a "screen recording" is a video of the content that is displayed at the display screen of the client device. In various embodiments, the screen recording is a video that is created by the user in accordance with instructions that are provided by the task. In some embodiments, the instructions of the task request include what content the user is to display at the client device and/or what activities the user should perform with respect to the content that is presented at the display screen of the device. For example, the task may instruct a user to open a specified application that is installed at the device and to screen record the user scrolling/browsing through at least one page or section of the application, where the displayed content of the application that is included in the screen recording identifies a history of user interest/activity with respect to items/features associated with the application. At the client device, video validation is performed on the screen recording. Video validation includes identifying a characteristic marker associated with the task within the screen recording. In various embodiments, one or more characteristic markers that are requested by the task are searched for within the screen recording at the client device. In response to the characteristic marker being identified, at least a portion of the screen recording or a compressed version of the screen recording is sent to a server for further processing. Only if the characteristic marker(s) can be found in the screen recording at the client device is the screen recording validated at the device and therefore (a portion thereof and/or a version thereof) uploaded to a server for further processing. In some embodiments, in addition to sending the screen recording to the server, a reward is also provided to the user that had provided the screen recording in response to a determination that the screen recording is validated at the device.

Embodiments of server-side structured data generation from a screen recording are described herein. A screen recording is obtained at a server from a client device. The screen recording shows a user's activities on the client device with respect to a task. The screen recording is a video that is recorded at a client device. In some embodiments, the video comprises content that is displayed at the display screen of the client device as a user is performing one or more activities (e.g., with respect to one or more applications) at the client device in accordance with the task. For example, the task may instruct a user to open a specified application that is installed at the device and to record the user browsing through at least one page or section of the application, where the displayed content of the application that is included in the screen recording identifies a history of user interest/activity with respect to items/features associated with the application. In some embodiments, prior to the client device uploading the screen recording to the server, the client device had performed a device-side validation on the screen recording to determine that the screen recording included at least a first characteristic marker that is required by the task to which the screen recording corresponds. At the server, a server-side video validation is performed on the screen recording. The server-side video validation includes determining whether the screen recording matches a set of validation parameters. For example, determining whether the screen recording matches the set of validation parameters includes determining whether a second characteristic marker associated with the task can be identified within the screen recording. A set of structured data is generated based at least in part on the server-side video validation. In some embodiments, the set of structured data comprises at least text-based information that is extracted from one or more video frames of the screen recording that correspond to the task.

FIG. 1 is a diagram showing an embodiment of a system for generating screen recordings and generating structured data from screen recordings. In the example of FIG. 1, system 100 includes client device 102, network 104, screen recording processing server 106, and task provider server 108. Network 104 may include data and/or telecommunication networks.

Task provider server 108 is configured to provide tasks for which screen recordings are to be recorded at client devices (e.g., such as client device 102) and then from which structured data is to be generated by a server (e.g., screen recording processing server 106). In various embodiments, "structured data" comprises (e.g., human-readable) text-based data that is formatted according to one or more formatting rules. For example, the structured data conforms to a tabular format with relationships between the different rows and columns. For example, the structured data captures a portion of the user's behavior that an application makes available (e.g., ride history, browsing history). In some embodiments, a task includes one or more of the following: one or more attributes associated with the type of contributor user that should be requested to perform the task, a set of device-side validation criteria (e.g., characteristic marker(s)) that can be used to validate the screen recording at a client device, a set of server-side validation criteria (e.g., characteristic marker(s) and/or other validation parameters) that can be used to validate the screen recording at a server (e.g., screen recording processing server 106), rules for processing video frames, rules for processing text that is recognized from video frames, and formatting rules for generating a set of structured data from a screen recording corresponding to the task. In some embodiments, a task that is generated or obtained by task provider server 108 instructs a user to record the content that is presented at a display screen of a client device as the user performs a prescribed set of actions/activities with respect to one or more applications that are executing at a client device. For example, the prescribed set of actions/activities to be performed by a user with respect to one or more applications causes the user's historical activities and/or interested items at the application(s) to be presented at the display screen and therefore included in one or more video frames of a screen recording. In a specific example, a task can instruct a user to scroll through at least a portion of a specified page within an application. As such, for example, the generated structured data to be generated from a screen recording that is made in accordance with the task could include a list of items that were shown/visible within the screen recording. For example, the tasks that are provided by task provider server 108 are generated by or on behalf of the developers of applications and/or another party that is researching user activities at the client device. In some embodiments, task provider server 108 is configured to send tasks to screen recording processing server 106.

Screen recording processing server 106 is configured to receive tasks from a server such as a task provider third-part server 108. For an obtained task, screen recording processing server 106 is configured to identify one or more contributor users that match the specified contributor user attributes that are specified by the task. Screen recording processing server 106 is then configured to send the task to the client device (e.g., such as client device 102) of each such contributor user to invite the contributor user to perform the task.

Client device 102 is configured to receive one or more tasks from screen recording processing server 106. For example, client device 102 comprises a networked computing device with a display screen. For example, client device 102 receives a task from screen recording processing server 106 for which screen recording processing server 106 has identified the user that operates client device 102 as being a contributor user for that particular task. In some embodiments, the task that is received at client device 102 is configured to be presented (e.g., as a set of instructions) within a designated application (e.g., that is associated with screen recording processing server 106) that has been installed at client device 102. Once the user of client device 102 selects to accept the task within the designated application, then the designated application and/or the operating system executing at client device 102 is configured to trigger the beginning of the recording of a video of what is shown at the display screen of client device 102 (i.e., what content the user of client device 102 is opening, browsing, and/or inputting). While the content of the screen of client device 102 is being recorded by client device 102, the user client device 102 may open the application(s) that are specified by the accepted task and perform the action(s) at the respective application(s) as specified by the accepted task such that the resulting user interfaces and pages/portions of the application(s) will be displayed at the screen of client device 102 and therefore included in the screen recording. After the user has completed the task according to the instructions that have been provided by the task, the user can make a selection within the designated application to end the screen recording. The resulting screen recording for a corresponding task is a video of content that is displayed at the screen of client device 102 that is pulled up, scrolled through, selected, and/or otherwise manipulated by the user of client device 102. In a first example, a task instructs a contributor user to open the AcmeFlicks application and scroll through a watch history to show within the screen recording at least the last 20 videos/shows that the user had watched using that application. In a second example, a task instructs a contributor user to open the Ryde application and scroll through a ride history to show within the screen recording the history of rides that the user has taken using the ride share application over the last six months.

After client device 102 obtains a screen recording corresponding to a task, client device 102 is configured to perform device-side validation on the screen recording. In various embodiments, the device-side validation of the screen recording determines whether the screen recording includes at least one characteristic marker that is associated with the task and therefore, is likely to include the type of content that is specified to be recorded by the task. For example, a characteristic marker is a Boolean phrase that is associated with the task. In some embodiments, if client device 102 determines that the screen recording includes the at least one characteristic marker that is associated with the task, then the screen recording has passed the device-side validation for the task and client device 102 is configured to send (at least a version of) the screen recording corresponding to screen recording processing server 106. Otherwise, if client device 102 determines that the screen recording does not include the at least one characteristic marker that is associated with the task, then the screen recording has failed the device-side validation for the task and client device 102 is configured to omit/forgo sending the screen recording corresponding to screen recording processing server 106. Returning to the example of a task that instructs a contributor user to generate a screen recording that shows the user's at least last 20 videos/shows that the user has watched using the AcmeFlicks application, a characteristic marker may be the term "AcmeFlicks & History." As will be described in further detail below, in some embodiments, in performing device-side validation of a screen recording, a client device such as client device 102 is configured to search through one or more video frames of the screen recording to look for at least one characteristic marker.

Screen recording processing server 106 is configured to receive screen recordings corresponding to one or more tasks from client devices such as client device 102. As described above, the screen recordings that are sent to screen recording processing server 106 from client devices such as client device 102 had already been validated by the client devices and have been determined to likely include the content that is specified to be recorded by their corresponding tasks. As will be described in further detail below, in various embodiments, screen recording processing server 106 is configured to perform server-side validation on each screen recording corresponding to a task to further confirm that the screen recording includes the content that is specified to be recorded by the task and if so, to generate a set of structured data from the recorded content in accordance with the one or more formatting rules that are associated with the task. In some embodiments, the set of structured data that is derived by screen recording processing server 106 is then sent to another server associated with performing research on user activity. In some embodiments, the set of structured data that is derived by screen recording processing server 106 is used by screen recording processing server 106 to perform analytics on user activity on the application(s) that have been specified by the tasks.

As shown by the system of FIG. 1 and will be described in further detail below, various embodiments described herein enable specific user activity to be provided by the contributor users themselves in an efficient and targeted way through screen recordings. For example, if it was desired to obtain a list of shows that was watched by a user using a specified application, it would be time consuming and error prone to receive user inputs of each show title. However, by extracting a set of structured text-based data that includes a list of the shows' titles (or other text-based information) from a screen recording that shows the displayed content at the contributor user's client device as the user scrolls through his/her/their watch history, the accurate and complete show titles can be obtained without relying on the contributor user's manual inputting of a long list of information. Furthermore, because a screen recording only records what is shown at the display screen of the client device at the direction of the contributor user, the privacy of the contributor user's general activities on the client device is preserved. Moreover, the sets of structured data that are generated from different screen recordings corresponding to the same task are standardized in format due to the formatting rules applied by the screen recording processing server, despite variations (e.g., in length) among the screen recordings.

Figure 2:
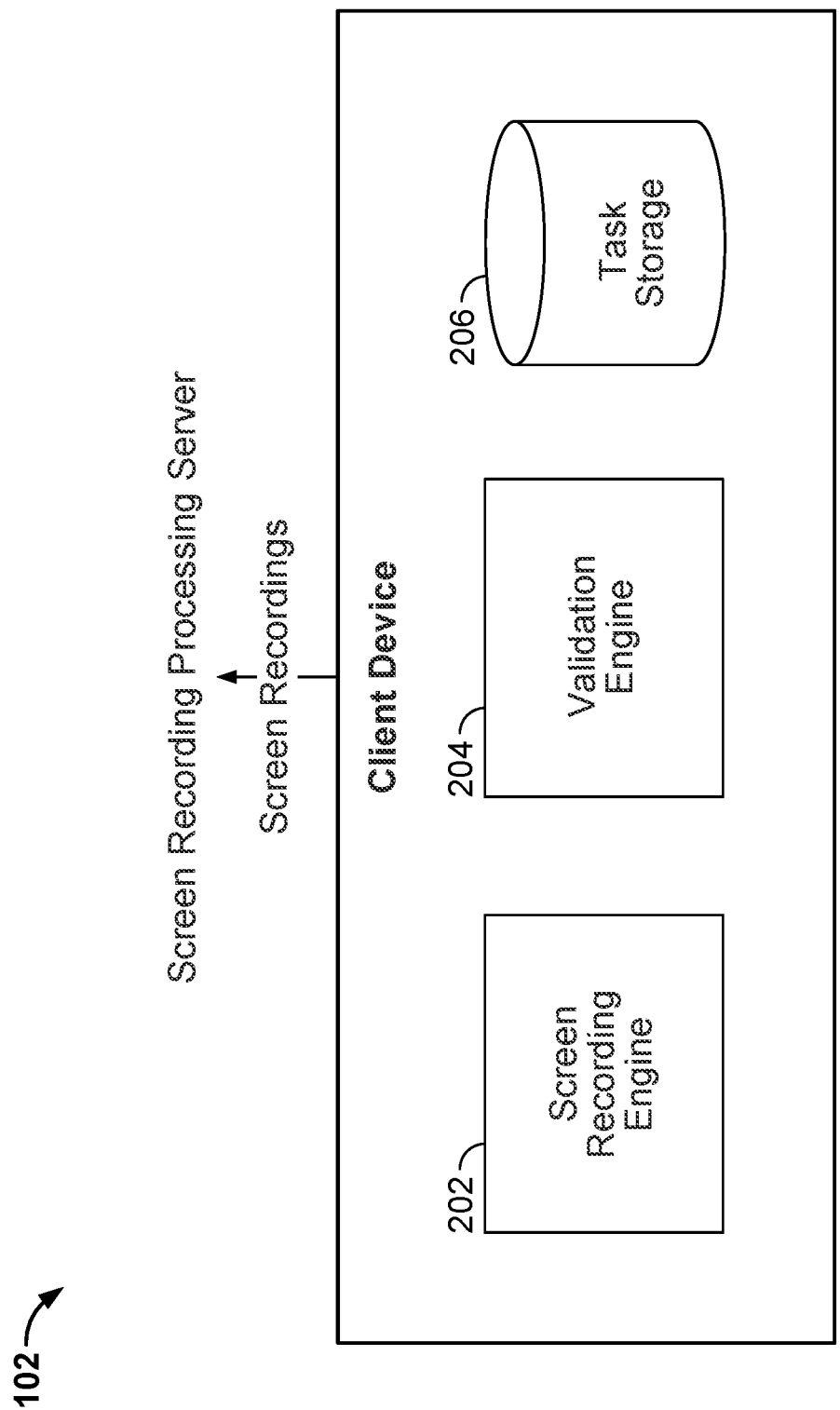
FIG. 2 is a diagram showing an example of a client device that is configured to obtain and perform device-side validation on a screen recording.

FIG. 2 is a diagram showing an example of a client device that is configured to obtain and perform device-side validation on a screen recording. In some embodiments, client device 102 of system 100 of FIG. 1 is implemented using the example client device of FIG. 2. The example client device of FIG. 2 includes at least screen recording engine 202, validation engine 204, and task storage 206. Each of screen recording engine 202 and validation engine 204 can be implemented using hardware and/or software. Task storage 206 may be implemented using a volatile or a non-volatile memory.

Screen recording engine 202 is configured to generate a screen recording comprising a video of the content that is displayed at the display screen of the client device in association with a task (e.g., for which associated instructions for contributor users are stored at task storage 206). In some embodiments, instructions for the type of actions that a contributor user should perform with respect to one or more applications at the client device to complete a task are presented within an application associated with providing tasks and obtaining corresponding screen recordings. After a user selection is input to the client device to accept a task at a display screen (not shown) of client device 102, screen recording engine 202 is configured to start a screen recording of the content presented at the display screen. During the screen recording, the user could be following the instructions provided by the accepted task that dictate which application(s) the user should be opening at the client device and which action(s) to perform within the application(s) such that the text information that is specifically requested by the task's instructions should be visible within the screen recording. After the user completes the instructions that are provided by the accepted task, the user can submit a user input at the client device to end the screen recording.

Validation engine 204 is configured to perform a device-side validation on a screen recording that is generated by screen recording engine 202. One reason to perform validation on a screen recording at the client device is to determine whether it likely includes the text information that is specifically requested by its corresponding task. If the screen recording can be validated by validation engine 204 at the client device, then it is determined that the screen recording likely does include the text information that is specifically requested by its corresponding task and therefore should be transmitted, over a network, to a screen recording processing server for additional processing in which a set of structured data is to be generated from the screen recording. If the screen recording cannot be validated by validation engine 204 at the client device, then it is determined that the screen recording likely does not include the text information that is specifically requested by its corresponding task and therefore should not be transmitted, over a network, to a screen recording processing server for additional processing in which a set of structured data is to be generated from the screen recording. As such, the validation process that is performed by validation engine 204 at the client device only allows screen recordings that likely include the text information that is requested by tasks to be transmitted over a network and to the screen recording processing server for more computationally intensive processing and filters out the screen recordings that likely do not include the requested text information and on which computationally intensive processing should be avoided by the screen recording processing server.

In various embodiments, validation engine 204 performs a device-side validation on a screen recording corresponding to a task based on the device-side validation criteria associated with that task. In some embodiments, the device-side validation criteria associated with each task, among other task-specific information, is stored at task storage 206. In some embodiments, a task's device-side validation criteria describe one or more preliminary checks on the screen recording such that if the screen recording fails at least one of the checks, then validation engine 204 is configured to determine that the screen recording cannot be validated. For example, one preliminary check is that the screen recording was generated within a predetermined window of time after the task was accepted.

In some embodiments, after the screen recording passes all of the preliminary checks, a task's device-side validation criteria prescribe a search technique to be applied by validation engine 204 to a screen recording that has been generated corresponding to that task. The search technique identifies a first frame within the screen recording (a video) in which at least one or more characteristic markers are to be searched. For example, a characteristic marker is a text-based Boolean value. Validation engine 204 then performs optical character recognition (OCR) on the identified frame to obtain the text information on the frame and then compares the recognized time to one or more characteristic markers included in the task's device-side validation criteria. If at least one characteristic marker can be found in the frame's recognized text, then validation engine 204 is configured to determine that the screen recording is validated. Otherwise, if no characteristic marker can be found in the frame's recognized text, then the search technique prescribes a next frame in the screen recording on which to perform OCR and compare the recognized text against the one or more characteristic markers. If the recognized text of the last frame of the screen recording that is prescribed by the search technique does not match the one or more characteristic markers, then validation engine 204 is configured to determine that the screen recording cannot be validated.

In various embodiments, where validation engine 204 determines that a screen recording is validated against its task's device-side validation criteria, validation engine 204 is configured to send the screen recording or a version thereof to a screen recording processing server. In some embodiments, validation engine 204 is configured to obtain a version of the screen recording that is smaller in size than the original screen recording and then send that version of the screen recording to the screen recording processing server so as to reduce the size of the data that is transmitted over a network and that needs to be processed by the server. In some embodiments, validation engine 204 is configured to first compress the screen recording into a smaller file and then send the compressed screen recording to screen recording processing server 106. In some embodiments, validation engine 204 is configured to identify a portion of the screen recording that includes redundant frames (e.g., adjacent frames that are very similar and therefore include redundant text information), trim the identified portion of the screen recording, and send the remainder of the screen recording (excluding the trimmed portion) to the screen recording processing server. In various embodiments, where validation engine 204 determines that a screen recording is validated against its task's device-side validation criteria, validation engine 204 is configured to present a message at the display screen of the client device to inform the user of the successful validation and, in some embodiments, the awarding of an incentive to the user.

In some embodiments, where validation engine 204 determines that a screen recording is not validated against its task's device-side validation criteria, validation engine 204 is configured to prompt the user at the client device to start another screen recording in another attempt to complete the task. In some embodiments, where validation engine 204 determines that a screen recording is not validated against its task's device-side validation criteria, validation engine 204 is configured to present an interface element at the display screen for the user to select to claim that the screen recording should be validated. In response to the user's claim that the screen recording should be validated, validation engine 204 is configured to send an award of an incentive to the user and also send the screen recording to the screen recording processing server for a reviewing user to review the screen recording for the text information that is requested by the task.

Figure 3:
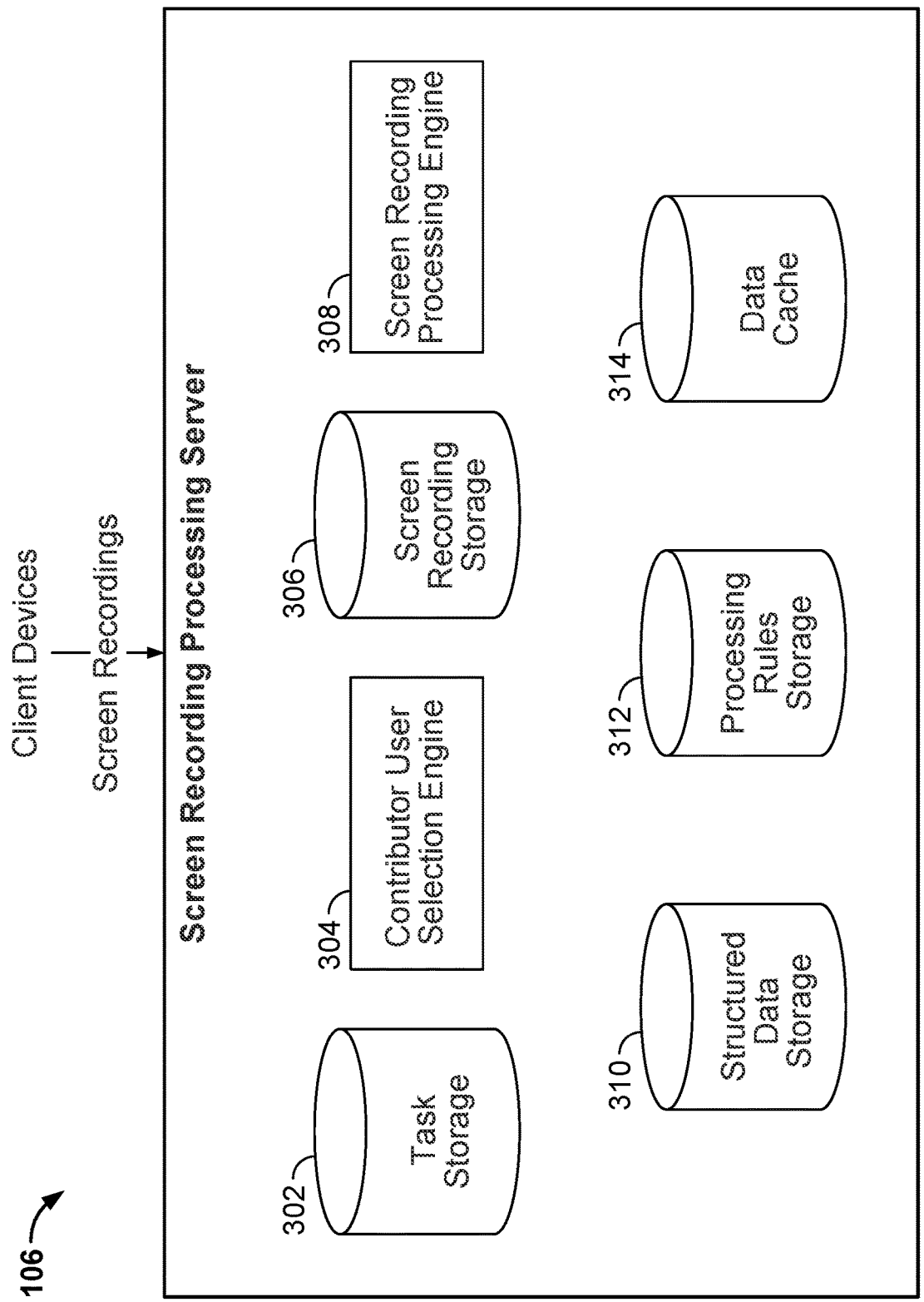
FIG. 3 is a diagram showing an example of a screen recording processing server that is configured to perform server-side validation on a screen recording and generate a set of structured data from the screen recording.

FIG. 3 is a diagram showing an example of a screen recording processing server that is configured to perform server-side validation on a screen recording and generate a set of structured data from the screen recording. In some embodiments, screen recording processing server 106 of system 100 of FIG. 1 is implemented using the example screen recording processing server of FIG. 3. The example client device of FIG. 3 includes at least task storage 302, contributor user selection engine 304, screen recording storage 306, screen recording processing engine 308, structured data storage 310, processing rules storage 312, and data cache 314. Each of contributor user selection engine 304 and screen recording processing engine 308 can be implemented using hardware and/or software. Task storage 302, screen recording storage 306, structured data storage 310, processing rules storage 312, and data cache 314 may each be implemented using a volatile or a non-volatile memory.

Task storage 302 is configured to store information associated with tasks that had been provided to the screen recording processing server. For example, for each task, task storage 302 may store one or more attributes associated with a contributor user for the task, instructions to be presented to a contributor user to complete the task, one or more applications for which the task is to be performed, a set of device-side validation criteria associated with the task, a set of server-side validation criteria associated with the task, one or more rules for cropping video frames from a screen recording that was generated in response to the task, and/or one or more formatting rules to generate a set of structured data from a screen recording that was generated in response to the task.

Contributor user selection engine 304 is configured to identify one or more contributor users that match to a task (for which information is stored at task storage 302) and then send the task to the client devices of those contributor user(s). In some embodiments, contributor user selection engine 304 is configured to compare the one or more attributes (e.g., a specified demographic) associated with a contributor user for a task against the attributes of a pool of users and then identify those of the users whose attributes match those associated with the task. Contributor user selection engine 304 is then configured to send to a client device of each contributor user that has been identified for a particular task, the task. The task would then be presented within a designated application that is executing at the client device so that the contributor user has the option of selecting and therefore accepting the task. As described above, after accepting a task at a client device, the client device obtains a screen recording corresponding to the task and then, if the screen recording can be validated at the client device, the client device sends (at least a version of) the screen recording to the screen recording processing server.

Screen recording storage 306 is configured to store screen recordings corresponding to one or more tasks. In various embodiments, screen recording storage 306 is configured to receive screen recordings corresponding to one or more tasks from client device(s) at which the screen recordings have been obtained.

Screen recording processing engine 308 is configured to perform server-side validation on each screen recording (that is stored at screen recording storage 306) and also generate a set of structured data from the screen recording. In some embodiments, a task's set of server-side validation criteria includes a set of validation parameters that a screen recording corresponding to the task should match in order to be validated at the server. In a first example, the set of validation parameters includes a characteristic marker that includes a Boolean value of text information that is requested by the task. In a second example, the set of validation parameters identifies a minimum number of items that are to be included in a specified list of items. In some embodiments, a task's device-side validation criteria and the task's server-side validation criteria may include some overlapping characteristic markers. In various embodiments, a task's set of server-side validation criteria includes a greater number of and/or more complex validation parameters than is required by that task's set of device-side validation criteria such that the server-side validation that is performed on a screen recording is more rigorous and computationally expensive than the device-side validation that is performed on the same screen recording.

In some embodiments, prior to performing the server-side validation on a screen recording corresponding to a task, screen recording processing engine 308 is configured to extract a set of key frames from the screen recording. In some embodiments, the set of key frames that is extracted from a screen recording is a subset of frames from the screen recording. Screen recording processing engine 308 is then configured to prepare the set of key frames corresponding to the screen recording. In some embodiments, preparing each key frame of the set of key frames comprises one or more of the following: detecting whether the application shown in the key frame is in dark mode or light mode, recoloring at least a portion of the key frame, converting the key frame to grayscale, converting the key frame to a monochromatic scheme, and cropping the monochromatic key frame into one or more cropped frames. In some embodiments, each cropped frame that is derived from each key frame of a screen recording comprises a section of the original key frame with text (e.g., black and white text on a white background). In some embodiments, screen recording processing engine 308 is configured to perform OCR on each cropped frame that is derived from a key frame of a screen recording and obtain recognized text. The text that is recognized from each cropped frame that is derived from a key frame is then stored with the cropped frame's corresponding location information in relation to the key frame from which it was derived.

In some embodiments, after screen recording processing engine 308 prepares each key frame of the set of key frames that is extracted from a screen recording corresponding to a task, screen recording processing engine 308 is configured to perform server-side validation on the screen recording using the task's set of server-side validation criteria, the prepared set of key frames extracted from the screen recording corresponding to the task, and the cropped frames that have been derived from the set of key frames. As will be described in further detail below, in some embodiments, simultaneously, concurrently, and/or at least partially in parallel with performing the server-side validation on the screen recording, screen recording processing engine 308 is configured to progressively build a set of structured data from the recognized text of the screen recording. In some embodiments, as screen recording processing engine 308 is building a set of structured data from the recognized text of the screen recording, screen recording processing engine 308 is configured to process the recognized text, such as, for example, removing redundant text, correcting OCR errors, updating the recognized text using application-specific rules, and/or formatting the structured data in accordance with rules stored at processing rules storage 312. For example, after screen recording processing engine 308 determines that the recognized text from cropped frames derived from one or more key frames of the screen recording matches one or more characteristic markers of the set of server-side validation criteria, screen recording processing engine 308 is configured to add that recognized text to a set of structured data (e.g., a list) that is requested by the task. In some embodiments, if screen recording processing engine 308 determines that the screen recording matches all of the set of validation parameters of the set of server-side criteria, then screen recording processing engine 308 determines that the screen recording is validated at the server and that therefore, all the text-based elements that are requested by the corresponding task are present within the screen recording. As such, screen recording processing engine 308 is able to generate the entire set of structured data using the recognized text from the screen recording that is requested by the task. For example, a set of structured data comprises one or more lists of items and a corresponding name for each such list. Screen recording processing engine 308 is configured to store a set of structured data that is generated from a screen recording corresponding to a task at structured data storage 310 and/or output the set of structured data at a user interface of an administrator. Otherwise, if screen recording processing engine 308 determines that the screen recording does not match all of the set of validation parameters of the set of server-side criteria, then screen recording processing engine 308 determines that the screen recording cannot be validated at the server and that therefore, fewer than all of the text-based elements that are requested by the corresponding task are present within the screen recording. As a result, screen recording processing engine 308 is not able to generate the entire set of structured data using the recognized text from the screen recording that is requested by the task.

Once screen recording processing engine 308 has generated a set of structured data from a screen recording corresponding to a task, in some embodiments, screen recording processing engine 308 is further configured to augment the set of structured data by querying a third-party server that stores or otherwise has access to supplemental information to add to the items of the structured data. For example, an item within a set of structured data of recently watched movies comprises a movie title and so screen recording processing engine 308 could query a third-party movie database for additional information about each movie title in the list. The queried information can be added to the set of structured data to provide additional context to the list of items. In some embodiments, the queried supplemental information is stored at data cache 314 so that such information can later be obtained locally, which is faster than querying a third-party server and also avoids paying a fee that might otherwise be associated with querying the third-party server. Screen recording processing engine 308 is configured to store an augmented set of structured data from a screen recording corresponding to a task at structured data storage 310 and/or output the augmented set of structured data at a user interface of an administrator.

Figure 4:
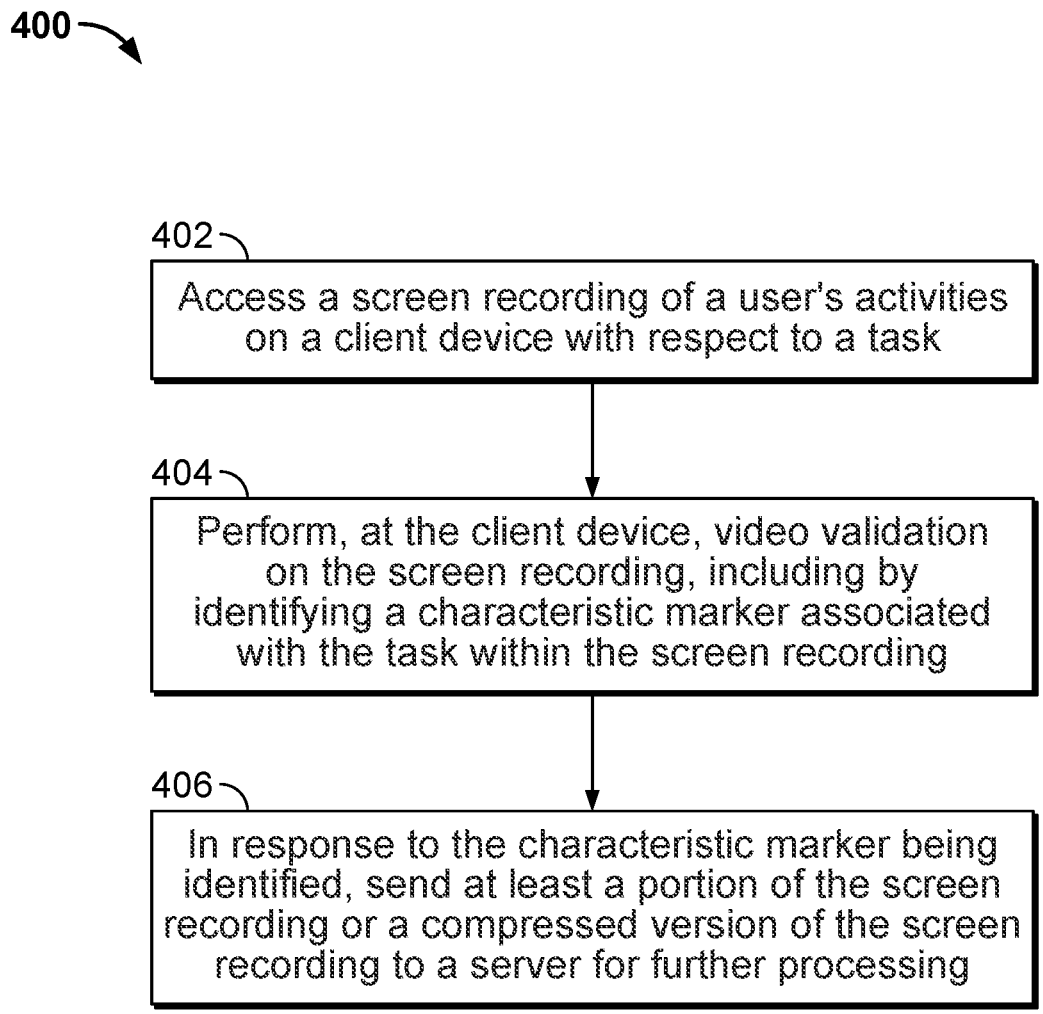
FIG. 4 is a flow diagram showing an embodiment of a process for performing device-side validation on a screen recording.

FIG. 4 is a flow diagram showing an embodiment of a process for performing device-side validation on a screen recording. In some embodiments, process 400 can be implemented at a client device such as client device 102 of system 100 of FIG. 1.

At 402, a screen recording of a user's activities on a client device with respect to a task is accessed. In some embodiments, the screen recording is generated at the client device after a user selects to accept the task. The screen recording comprises a video that captures the content that is displayed at the client device as the user performs one or more activities (e.g., interacts, browses, scrolls through, and/or manipulates user interfaces) at one or more applications at the client device.

At 404, video validation is performed at the client device on the screen recording, including by identifying a characteristic marker associated with the task within the screen recording. In some embodiments, the screen recording is validated at the client device using a set of device-side validation criteria that is associated with the task. In some embodiments, a device-side video validation is performed at the client device to, at least, confirm that the screen recording includes at least one characteristic marker associated with the task before the screen recording is sent to a server (e.g., a screen recording processing server) for additional processing. A device-side validation process ensures that a screen recording that does not have a characteristic marker associated with the task and is therefore unlikely to include the text information that is requested by the task, is prevented from being sent to the server for (even more) computationally expensive processing.

At 406, in response to the characteristic marker being identified, at least a portion of the screen recording or a compressed version of the screen recording is sent to a server for further processing. In some embodiments, if the screen recording can be modified to reduce its file size in a way that does not compromise its integrity and the ability from which text information can be extracted, the screen recording can be trimmed and/or compressed at the client device prior to being sent to the server. In some embodiments, the server will further process the screen recording by performing a server-side validation on the screen recording and also extract a set of structured data from the screen recording.

Figure 5A:
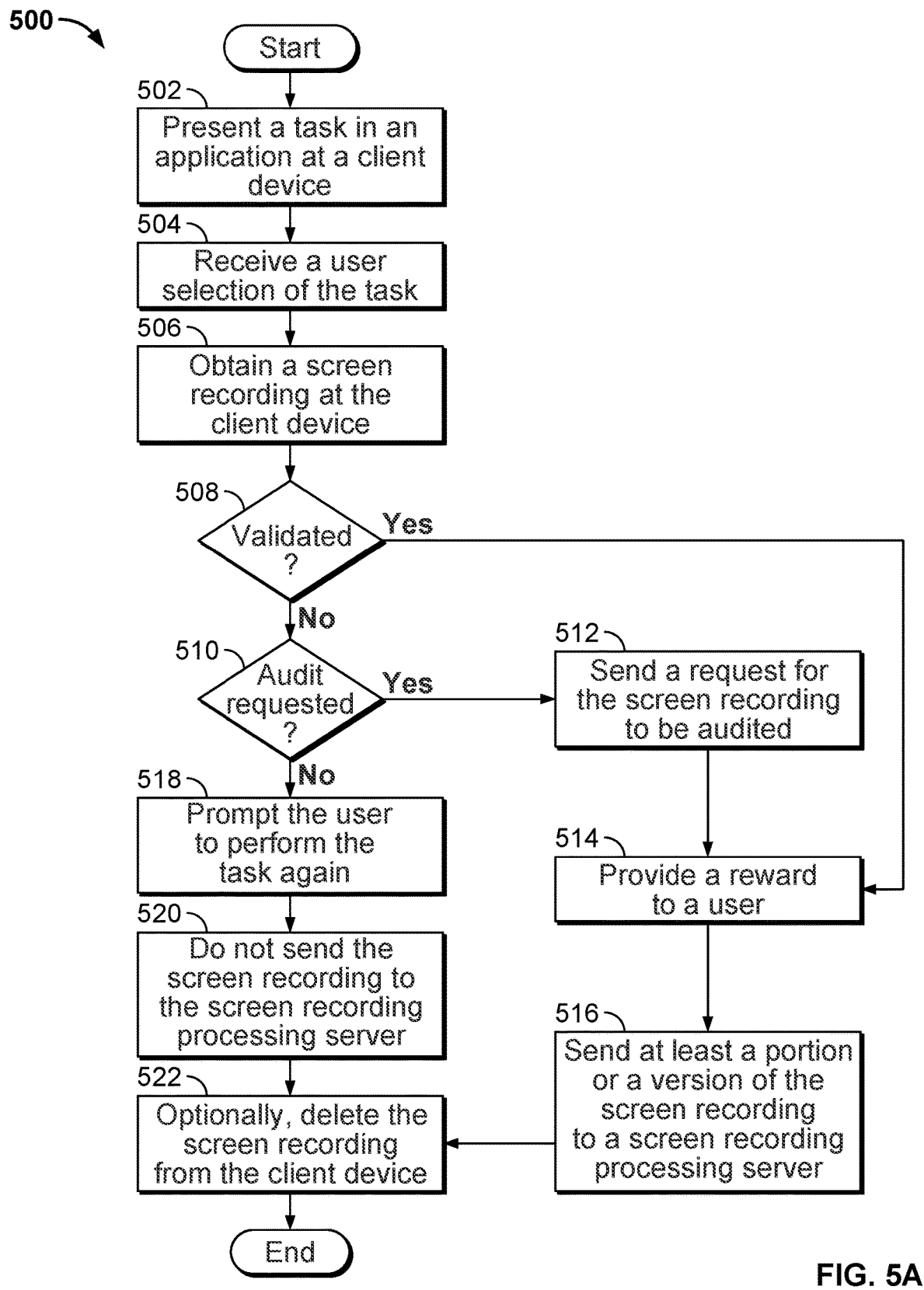
FIG. 5A is a flow diagram showing an example of a process for processing a screen recording at a client device.

FIG. 5A is a flow diagram showing an example of a process for processing a screen recording at a client device. In some embodiments, process 500 can be implemented at a client device such as client device 102 of system 100 of FIG. 1. In some embodiments, process 400 of FIG. 4 can be implemented, at least in part, using process 500.

At 502, a task is presented in an application at a client device. In some embodiments, the task may be received from a screen recording processing server. The task may be presented within a designated application with the task's instructions that request the user to perform activities with respect to an application and perform screen recording while the activities are performed.

For example, the task requests a user to open the AcmeFlicks application at the client device and browse/scroll through a portion of the application that shows at least 20 titles that the user has favorited.

At 504, a user selection of the task is received. A user selection to accept the task and perform its requested activities is received.

At 506, a screen recording is obtained at the client device. Sometime after the user selection is received, the content presented at the display screen of the client device is recorded and a video of the content that is shown at the display screen of the client device (as the user is performing activities at the client device) is obtained.

At 508, whether the screen recording is validated is determined. In the event that the screen recording is validated, control is transferred to 514. Otherwise, in the event that the screen recording is not validated, control is transferred to 510. The screen recording is analyzed in accordance with a set of device-side validation criteria associated with the task to determine whether the screen recording likely includes the type of content that is requested by the task. In some embodiments, device-side validation includes determining at the client device whether the screen recording includes a characteristic marker that is included in the set of device-side validation criteria associated with the task. The results of the device-side validation are presented at the client device to inform the user.

Returning to the example task of opening the AcmeFlicks application at the client device and browsing/scrolling through a portion of the application that shows at least 20 titles that the user has favorited, the characteristic marker may be a Boolean value that comprises the term "Acme-Flicks & Favorite" to check whether the correct portion of the correct application had been opened while the screen was recorded.

An example process for performing device-side validation is described in FIG. 6, below.

At 510, whether an audit of the validation results of the screen recording is requested by a user is determined. Where the screen recording is not validated at the client device, interface elements associated with accepting the validation results or contesting them are presented. In the event that the user has selected the interface element to contest the validation results, an audit is requested and so control is transferred to 512. Otherwise, in the event that the validation results are accepted, control is transferred to 518. For example, the user may contest a result of invalidation if the user believes that the screen recording does include the content that is requested by the selected task.

At 512, a request for the screen recording to be audited is sent. Where the user had selected to contest a result of invalidation, a request to audit the screen recording is sent to a server. For example, the audit request and the screen recording are both sent to an audit server for a more rigorous validation process to be performed on the screen recording to check the screen recording includes the content that is requested by the task. For example, the audit request will entail a reviewer user manually reviewing the screen recording to verify that it shows the requested content.

At 514, a reward is provided to a user. If the device-side validation had been successful, or alternatively, the device-side validation had not been successful but the user had requested an audit, a reward is provided to an account associated with the contributor user. For example, the reward is a predetermined amount of money or other credit that incentivizes contributor users to continue to participate in completing tasks to enable research of user activities.

At 516, at least a portion of a version of the screen recording is sent to a screen recording processing server. If the screen recording can be reduced in size in a way that does not truncate or obscure the portion of the video that includes the content that is requested by the task, the screen recording can be modified to a smaller file size before it is sent to the screen processing recording server for further processing to reduce the amount of data that is transferred over a network (e.g., to speed up the time for transmission). In a first example, if the screen recording can be efficiently compressed at the client device and in a way that maintains the integrity of the video, then the screen recording is compressed before it is sent to the screen recording processing server. In a second example, if the screen recording is detected at the client device to include several redundant frames (e.g., adjacent video frames that include substantially similar text information), then some portion(s) of the screen recording with the redundant frames can be trimmed or cut.

At 518, the user is prompted to perform the task again. Where the device-side validation had not been successful but the user did not request an audit of the screen recording, the user is prompted to perform the task again (e.g., make another screen recording while performing the requested activities).

At 520, the screen recording is not sent to the screen recording processing server. The screen recording that did not pass the device-side validation is not sent to the screen recording processing server to prevent the server from performing computationally expensive processing on a screen recording for which is not likely to include the content that is requested by the task.

At 522, the screen recording is optionally deleted from the client device. The screen recording can be programmatically deleted from the client device for a few reasons. A first reason is that the screen recording may be a large file and deleting the screen recording will reduce the amount of data that is stored on the client device. A second reason is to prevent the contributor user from potentially resubmitting the same screen recording for the same task more than once (e.g., within a short period of time) to receive more instances of rewards for only having completed the task once.

Figure 5B:
FIG. 5B is a diagram showing an example user interface that shows the validation results of a screen recording that could not be validated at the client device.

FIG. 5B is a diagram showing an example user interface that shows the validation results of a screen recording that could not be validated at the client device. User interface 550 is an example user interface that can be presented at a client device (e.g., client device 102 of system 100 of FIG. 1) after a screen recording that is submitted by a contributor user for a task cannot be validated at the client device using a process such as process 500 of FIG. 5A. As shown in user interface 550, a message may be presented to indicate that the screen recording does not include the required screen(s) from the Ryde application but that the contributor user should make a selection to contest the validation results (by selecting the hyperlinked "click here" phrase). Furthermore, user interface 550 includes "Try again" button 552, which when selected, allows the contributor user to generate a new screen recording at a client device for this task. User interface 550 also includes "Upload from Photos" element 554, which when selected, allows the contributor user to upload a new video (a new screen recording) to complete the task.

Figure 6:
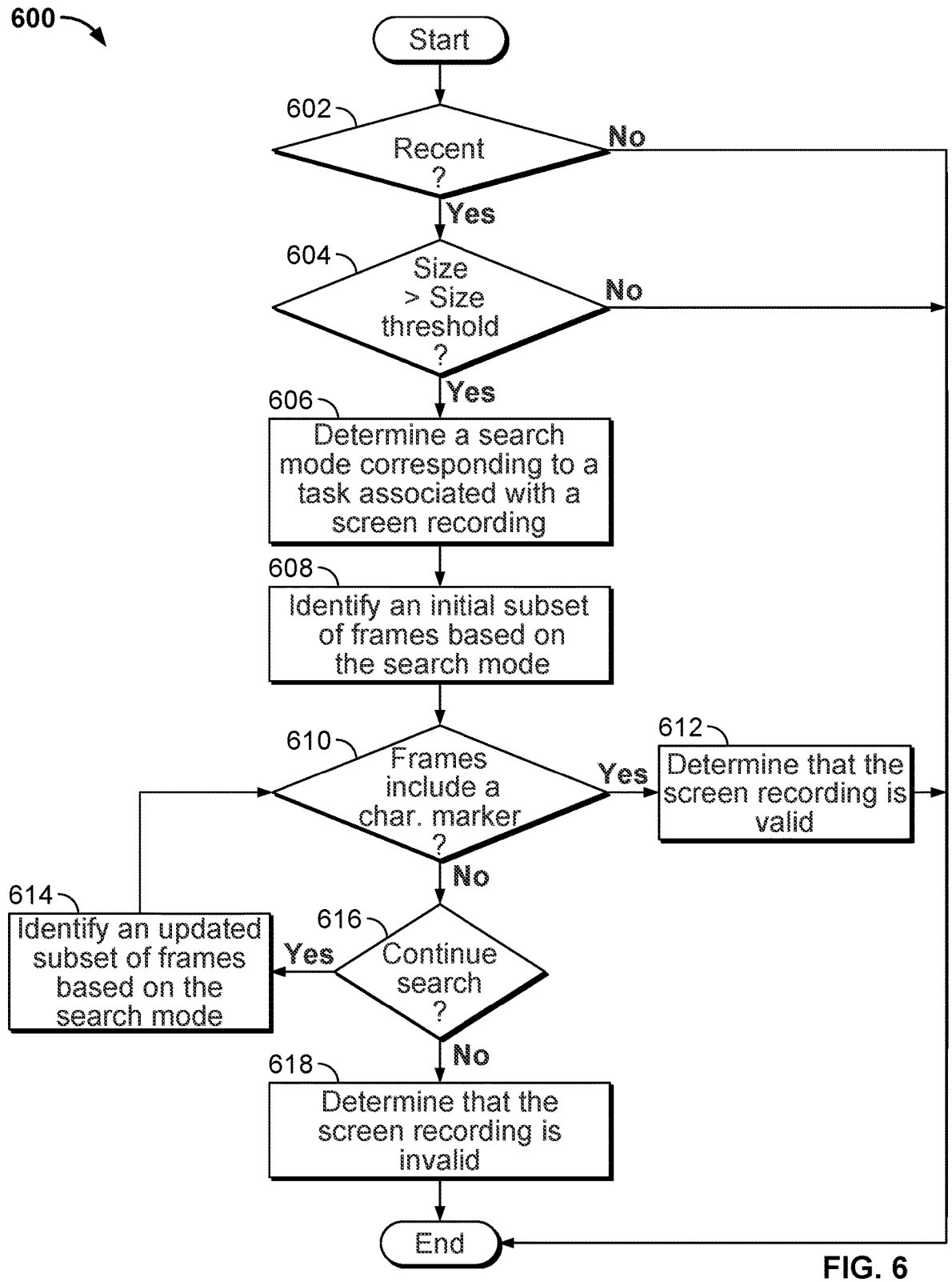
FIG. 6 is a flow diagram showing an example of a process for performing validation at a client device.

FIG. 6 is a flow diagram showing an example of a process for performing validation at a client device. In some embodiments, process 600 can be implemented at a client device such as client device 102 of system 100 of FIG. 1. In some embodiments, step 508 of process 500 of FIG. 5A can be implemented, at least in part, using process 600.

Process 600 is an example process by which to validate a screen recording at a client device. As will be described below, process 600 recognizes text (e.g., using OCR) from selected frames of the screen recording and then compares the text against a device-side characteristic marker.

At 602, whether a screen recording was recently generated is determined. In the event that the screen recording was recently generated, control is transferred to 604. Otherwise, in the event that the screen recording was not recently generated, process 600 ends. For example, to determine whether a screen recording was recently generated, the timestamp of the screen recording is compared to the timestamp at which the user had selected to accept the task at the client device. If the difference between the timestamps is within a predetermined window of time, then the screen recording is determined to be recently generated (and not a previously recorded, potentially no longer relevant) video.

At 604, whether a file size of the screen recording is greater than a file size threshold is determined. In the event that the file size of the screen recording is greater than a file size threshold, control is transferred to 606. Otherwise, in the event that the file size of the screen recording is less than or equal to a file size threshold, process 600 ends. The file size of the screen recording is compared against a predetermined file size. The predetermined file size can be selected to be a minimum size of a screen recording that is expected to include the content that is requested by the task. The rationale is that a screen recording whose file size is too small (e.g., smaller than or equal to the predetermined file size) is too short to be able to include the content that is requested by the task.

At 606, a search mode corresponding to a task associated with a screen recording is determined. In some embodiments, a search mode determines the initial place within the screen recording video from which images are checked for whether they include a characteristic marker associated with the task. In some embodiments, the characteristic marker associated with the task is a Boolean value that is included in a set of device-side validation criteria associated with the task. For example, possible search modes with which to determine an initial subset of frames include "middle," "left," and "right."

In some embodiments, a search mode is predetermined for a task (or associated with the task) based on historical data of where in screen recordings the text content that is requested by the task (or associated with the task) tends to appear. For example, where a task instructs a contributor user to open up a specific page and to scroll down to a particular portion of the page for requested content, historically, the earlier portions of the screen recordings that are generated for this task do not show the requested content (e.g., because the contributor user is often still reviewing the instructions associated with the task immediately after the recording of the display screen begins) and as such, the search mode that is predetermined for the task may be the "middle" search mode. As will be described in the example of FIG. 7 below, the middle search mode starts the search for the characteristic marker in a frame that is recorded during the middle of the screen recording.

Figure 7:
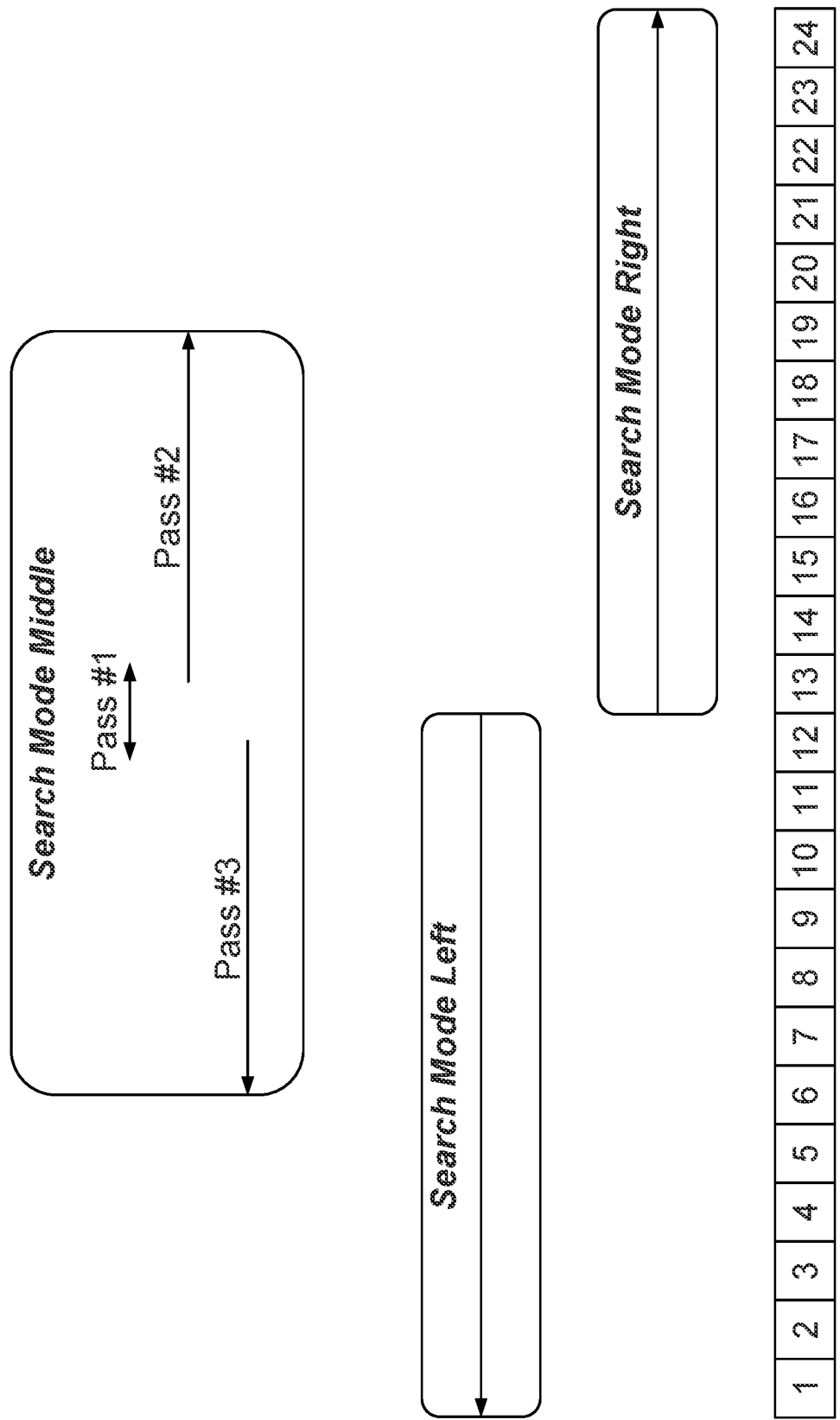
FIG. 7 is a diagram showing an example of using a determined search mode to determine a sequence of subsets of frames extracted from a screen recording to search for a characteristic marker at a client device during a device-side validation process.

At 608, an initial subset of frames is identified based on the search mode. In some embodiments, the initial subset of frames corresponding to the determined search mode is identified based on a set of frames that are extracted from the screen recording. For example, a set parameter determines the number of frames that is extracted for each second duration of the video. In a specific example, two frames are extracted from the screen recording for each one second duration of the video. Returning to the example where possible search modes with which to determine an initial subset of frames include "middle," "left," and "right," the initial subset of frames can be selected from the total number of extracted frames. FIG. 7, below, describes examples of selecting subsets of frames based on different determined search modes.

At 610, whether the subset of frames includes a characteristic marker is determined. In the event that the subset of frames includes a characteristic marker, control is transferred to 612. Otherwise, in the event that the subset of frames does not include a characteristic marker, control is transferred to 616. In some embodiments, OCR is performed on each sequential frame of the selected subset of frames and the recognized text from each frame is compared to each of one or more (e.g., device-side) characteristic markers associated with the task until a frame, if any, includes text that matches at least one of the characteristic markers associated with the task.

At 612, it is determined that the screen recording is valid. If a frame in the sequential checking of frames of step 610 includes at least one characteristic marker associated with the task, then the screen recording is determined to be valid.

At 616, whether the search through the screen recording is to continue is determined. In the event that the search through the screen recording is to continue, control is transferred to 614. Otherwise, in the event that the search through the screen recording is no longer to continue, control is transferred to 618. If no characteristic marker can be determined from the recognized text from each frame of the identified subset of frames, then control is transferred to 614. For example, the search for an updated set of frames through the screen recording may continue if the determined search mode prescribes a subsequent subset of frames to search and/or if there are additional frames from the extracted set to analyze. If the determined search mode does not prescribe for an updated set of frames through the screen recording to be checked for a characteristic marker and/or all of the extracted frames of the screen recording have already been checked for a characteristic marker, then the search ends.

At 614, an updated subset of frames is identified based on the search mode. The search mode may prescribe a subsequent subset of frames from the extracted set from the screen recording to be checked for a characteristic marker.

At 618, it is determined that the screen recording is invalid. Because the identified frames that have been checked for a characteristic marker did not include the characteristic marker, the screen recording is determined to be invalid.

FIG. 7 is a diagram showing an example of using a determined search mode to determine a sequence of subsets of frames extracted from a screen recording to search for a characteristic marker at a client device during a device-side validation process. In some embodiments, steps 606, 608, 610, 616, and 614 of process 600 of FIG. 6 may be implemented using the example described in FIG. 7.

In the example of FIG. 7, the three possible search modes with which to describe the order of frames in which text is extracted and processed for content validation at a client device includes: "middle," "left," and "right." Each of the search modes is described in further detail below:

"middle": Taking an example of a 12 second video, and where two frames are extracted for each second duration of video, 12*2=24 frames are extracted from the screen recording. The first frame that is going to be analyzed is the middle frame i.e., 12th frame (24/2=12). Analyzing a frame includes performing OCR on the text of the frame and then determining whether the recognized text includes a characteristic marker associated with the task's set of device-side validation criteria. If the $12^{th}$ frame does not include a characteristic marker, then each successive frame after the $12^{th}$ frame will be sequentially analyzed until the third quarter of video, i.e., up to the 18th frame has been processed. If the search for text is unsuccessful up to the third quarter of the video (e.g., the $18^{th}$ frame of this example), the search is moved to the second quarter of the video in descending order, i.e., from the 11th frame to 6th frame, excluding the middle frame as it has been already processed.

An example of a processing sequence of the "middle" search mode is shown in FIG. 7 and can also be summarized as:

First pass: Middle frame [12th frame],

Second pass: Process 3rd quarter of the video [13th to 18th frame], and

Third pass: Process 2nd quarter of video in descending order [11th frame to 6th frame].

"right" search mode: Taking an example of a 12 second video, and where two frames are extracted for each second duration of video, 12*2=24 frames are extracted from the screen recording. The first frame that is going to be analyzed is the frame just after the middle frame, i.e., 13th frame. If the $13^{th}$ frame does not include a characteristic marker, then each successive frame after the $13^{th}$ frame will be sequentially analyzed until the last frame, i.e., 24th frame.

"left" search mode: Taking an example of a 12 second video, and where two frames are extracted for each second duration of video, 12*2=24 frames are extracted from the screen recording. The first frame that is going to be analyzed is the first frame, i.e., 1st frame. If the 1st frame does not include a characteristic marker, then each successive frame after the 1st frame will be sequentially analyzed until the middle frame, i.e., 12th frame.

Figure 8:
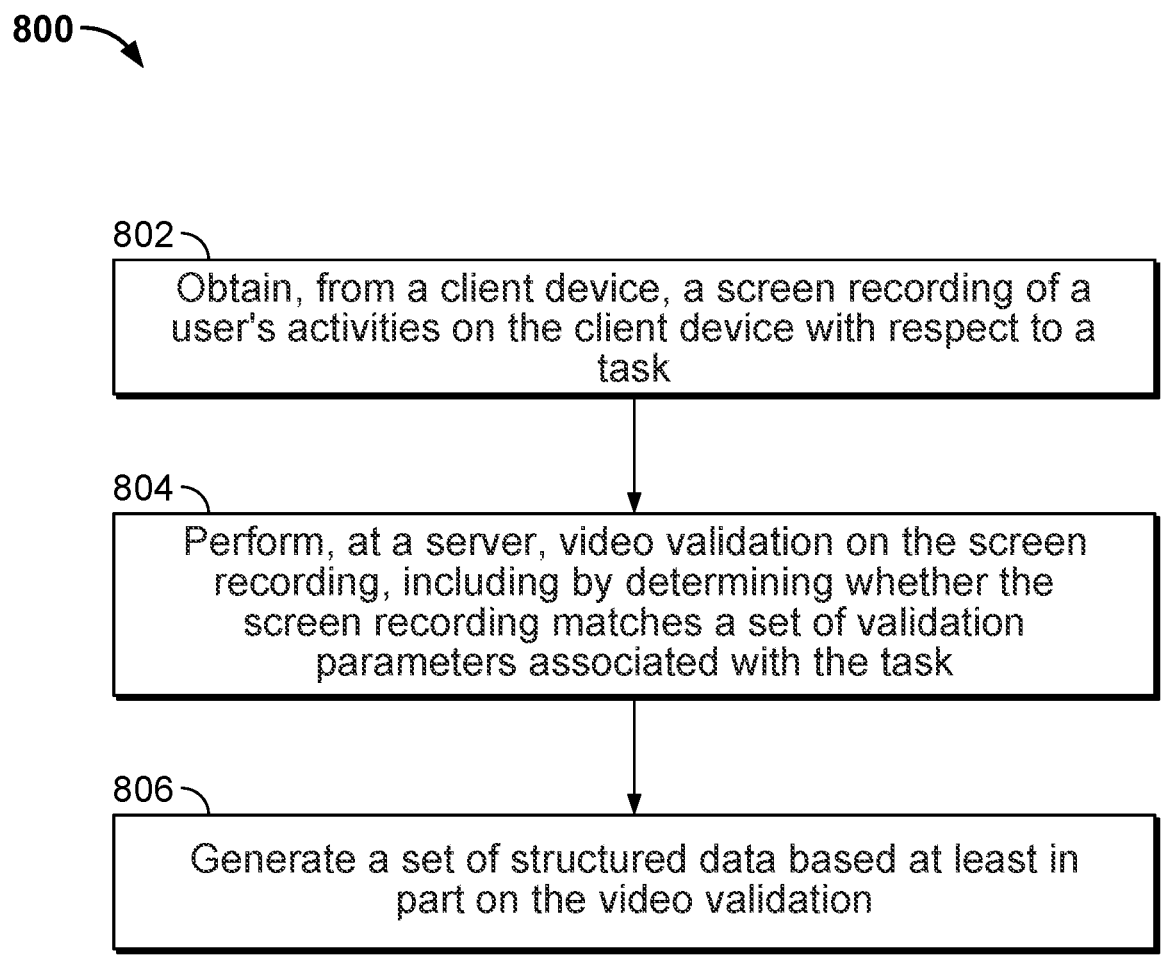
FIG. 8 is a flow diagram showing an embodiment of a process for generating a set of structured data from a screen recording at a server.

FIG. 8 is a flow diagram showing an embodiment of a process for generating a set of structured data from a screen recording at a server. In some embodiments, process 800 can be implemented on a server such as screen recording processing server 106 of system 100 of FIG. 1.

At 802, a screen recording of a user's activities on a client device with respect to a task is obtained from the client device. The received screen recording is associated with a task. If the screen recording is compressed, in some embodiments, it is first decompressed before it is further processed. In some embodiments, the received screen recording has already been validated at the client device from which it was obtained.

At 804, video validation is performed, at a server, on the screen recording, including identifying by determining whether the screen recording matches a set of validation parameters associated with the task. A server-side validation on the screen recording is performed to confirm that the screen recording actually includes the content that is requested by the task. In various embodiments, the server-side validation is more rigorous than the device-side validation because the server-side validation checks for whether the screen recording, across multiple of its frames, matches a set of validation parameters that is requested by the task (whereas, for example, the device-side validation may just confirm that one frame of the screen recording includes one characteristic marker). As will be described in further detail below, the server-side validation on the screen recording includes recognizing text from each of multiple frames of the screen recording and comparing the recognized text to the enumerated characteristic markers or other validation parameters of the server-side validation criteria of the task.

At 806, a set of structured data is generated based at least in part on the video validation. If the screen recording can be validated at the server (i.e., confirmed to include all the content that is requested by the task), then a set of structured data is to be generated (and output) from the screen recording. In some embodiments, the set of structured data comprises a list of entries (e.g., including one or more headings or subheadings) of text that are recognized (and processed) from the screen recording. In some embodiments, the server-side validation and the generation of the set of structured data occur at least partially in parallel. For example, as more characteristic markers are identified within the frame(s) of the screen recording, a new portion of the set of structured data is built using the newly recognized text.

Figure 9:
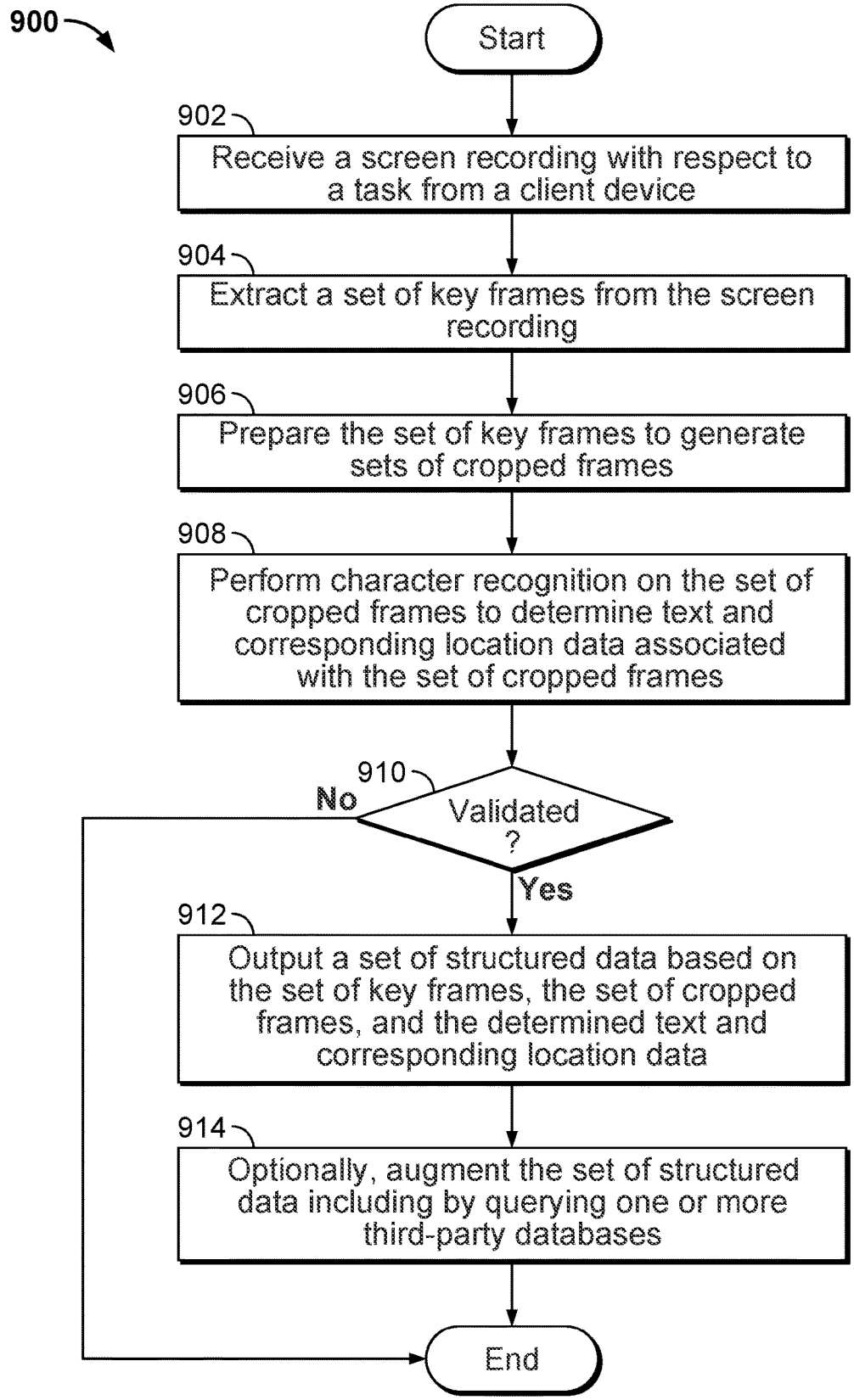
FIG. 9 is a flow diagram showing an embodiment of a process for generating a set of structured data from a screen recording at a server.

FIG. 9 is a flow diagram showing an embodiment of a process for generating a set of structured data from a screen recording at a server. In some embodiments, process 900 can be implemented on a server such as screen recording processing server 106 of system 100 of FIG. 1. In some embodiments, process 800 of FIG. 8 may be implemented, at least in part, using process 900.

At 902, a screen recording with respect to a task is received from a client device.

At 904, a set of key frames is extracted from the screen recording. In some embodiments, a subset of all frames in the screen recording video is extracted and referred to as "a set of key frames." In some embodiments, each "key frame" is identified based on its uniqueness relative to one or more of its adjacent frames in the screen recording. The set of key frames is selected to represent relatively unique frames within the screen recording. Put another way, the set of key frames is selected such that they do not include/show substantially overlapping content that is displayed at a client device's display screen. An example process of extracting a set of key frames from a screen recording is described in FIG. 10, below.

At 906, the set of key frames is prepared to generate sets of cropped frames. In various embodiments, each key frame is prepared such that a corresponding set of one or more cropped frames, each comprising a portion of the processed key frame, are generated from each key frame. In some embodiments, prior to generating one or more cropped frames from a key frame, one or more of the following types of processing are performed on the key frame: a (e.g., dark or light) mode associated with the key frame is detected, the key frame is at least partially recolored, the key frame is updated to be in grayscale, and the key frame is binarized. In some embodiments, as a result of the processing performed on each key frame, each cropped frame that is generated from a processed key frame comprises a portion of the key frame and includes a piece of black text on a white background. In some embodiments, images or other content that cannot be recognized by an OCR technique are excluded from cropped frames (e.g., by either cropping out such content or by generating cropped frames of only text in the original key frame). In some embodiments, each cropped frame is determined from cropping rules that are associated with the task or an application from which is requested by the task. In some embodiments, each cropped frame associated with a key frame is associated with the location information within the key frame from which the cropped frame was cropped. An example process of preparing a key frame that is extracted from a screen recording is described in FIG. 11, below.

At 908, character recognition is performed on the set of cropped frames to determine text and corresponding location data associated with the set of cropped frames. The cropped frames that are derived from each key frame are input into an OCR process to obtain recognized text corresponding to each cropped frame. An example of applying OCR to cropped frames derived from a key frame is described in FIG. 12, below.

At 910, whether the screen recording is validated is determined. In the event that the screen recording is validated, control is transferred to 912. Otherwise, in the event that the screen recording is not validated, process 900 ends and a set of structured data is not generated from the screen recording. In some embodiments, scraping is performed on the set of key frames, the set of cropped frames, and the determined text and corresponding location data to progressively build a set of structured data. The progressively updated set of structured data is also compared against a set of server-side validation criteria associated with the task. In some embodiments, the set of server-side validation criteria associated with the task includes a set of characteristic markers that the screen recording needs to show and/or other validation parameters (e.g., a number of categories and/or a number of items that should be included in the screen recording). In some embodiments, at least one characteristic marker that is checked at the server may be substantially similar to a characteristic marker that is checked for at the client device during the device-side validation process (e.g., in a process such as process 500 of FIG. 5A). In some embodiments, the text that is recognized from the cropped frames and for multiple adjacent images are analyzed together to correct OCR errors, update text recognized from one key frame with text that is recognized from another key frame, update text and/or formatting thereof using the content of the original (unprocessed) key frame, and remove redundantly recognized text. The analyzed and updated text are both compared to the server-side validation criteria as well as added to the progressively generated set of structured data.

If the server-side validation criteria can be met from the analyzed and updated text that have been recognized from the key frames, then the screen recording is validated at the server and the set of structured data is progressively built until a stop condition is met (e.g., the recognized text from all of the key frames have been analyzed). Otherwise, if all the key frames have been analyzed and updated but the server-side validation criteria cannot be met, then the screen recording is not validated at the server and the set of structured data built thus far is not output (e.g., and is instead, discarded).

Unlike the device-side validation process, which is constrained by the quick turnaround that is desired for presenting validation results to the user, the server-side validation is not constrained by time and in various embodiments, is more rigorous and computationally expensive than the device-side validation process. One reason that the server-side validation is not constrained by time and in various embodiments, is more rigorous and computationally expensive than the device-side validation process is that the server-side validation process checks for more characteristic markers and/or other validation parameters than was checked for during the device-side validation process. Given the example task that instructs a contributor user to open the AcmeFlicks application and scroll through a watch history to show within the screen recording at least the last 20 videos/shows that the user had watched using that application, the device-side validation criteria may specify that the screen recording corresponding to that task be recently generated, have a file size greater than a predetermined file size, and include at least one frame that shows the Boolean term "AcmeFlicks & History." In contrast, the server-side validation criteria may specify that the screen recording corresponding to that task shows the Boolean term "AcmeFlicks & History" and also at least 20 entries/titles of videos associated with the application's watch history list, which may be displayed across multiple frames.

At 912, a set of structured data is outputted based on the set of key frames, the set of cropped frames, and the determined text and corresponding location data. For example, the set of structured data comprises a list of items (e.g., with a list of names, a text entry for each item, and one or more sub-headings under which to group the items). The set of structured data can be sent to another server and/or presented at a user interface of an administrative user. In some embodiments, analytics may be performed on multiple sets of structured data that are generated from screen recordings provided for the same task.

At 914, optionally, the set of structured data is augmented including by querying one or more third-party databases. In some embodiments, for each of at least some items on the generated set of structured data, a third-party database (e.g., a movie database or an encyclopedia resource) is queried for supplemental information corresponding to that item. The information included for each such item/entry in the set of structured data can be then be augmented to include the queried data.

Figure 10:
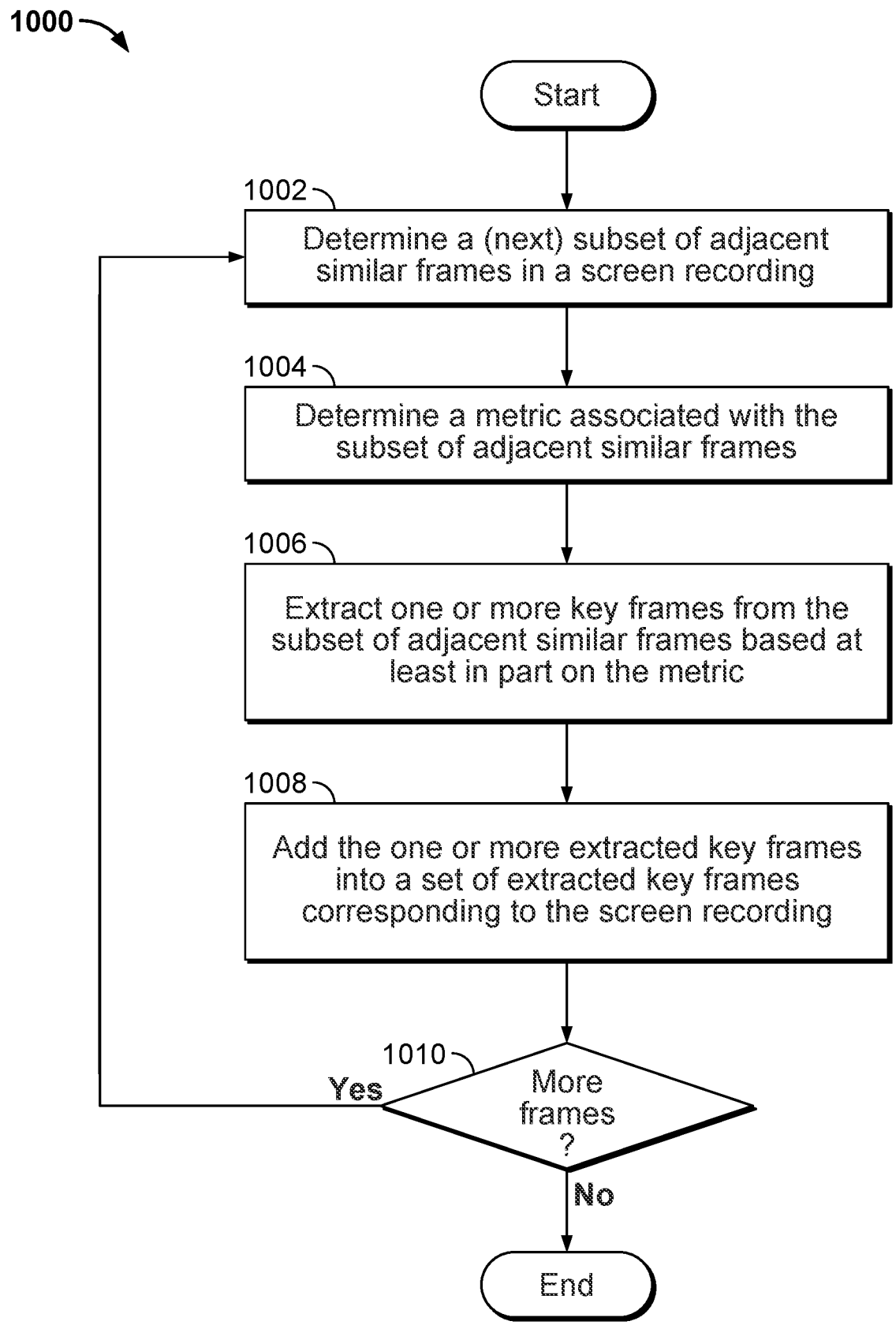
FIG. 10 is a flow diagram showing an example process for extracting a set of key frames from a screen recording.

FIG. 10 is a flow diagram showing an example process for extracting a set of key frames from a screen recording. In some embodiments, process 1000 can be implemented on a server such as screen recording processing server 106 of system 100 of FIG. 1. In some embodiments, step 904 of process 900 of FIG. 9 may be implemented, at least in part, using process 1000.

At 1002, a (next) subset of adjacent similar frames in a screen recording is determined. Starting from the first recorded frame in the screen recording, a subset of frames that includes content that is similar to each other is determined. For example, similar subsets of adjacent frames (i.e., frames that are recorded sequentially) can be determined using optical flow or a clustering technique.

In some embodiments, given that tasks generally request the user to scroll through a portion of an application to display at the display screen specified information, a screen recording typically shows content of an application that is scrolled through in a first or a second direction along one axis. For example, if the screen recording were recorded at a smart phone, then the screen recording would show content in an application that is scrolled through up or down along the length of the smart phone. Given this fixed axis along which content shifts (via user scrolling), the search for a subset of similar frames can be simplified because it need only search for changes (e.g., in pixels) between adjacent frames along the fixed axis.

At 1004, a metric associated with the subset of adjacent similar frames is determined. For example, a metric that captures the variation across the subset of adjacent similar frames can be determined. The greater the metric indicates variation across the subset of adjacent similar frames, the more unique the frames of the subset are. And the less the metric indicates variation across the subset of adjacent similar frames, the less unique the frames of the subset are.

At 1006, one or more key frames are extracted from the subset of adjacent frames based at least in part on the metric. In some embodiments, a predetermined mapping or ratio is used to determine a number of frames to extract from the subset of adjacent similar frames based on the determined metric. In some embodiments, only substantially non-overlapping frames from the screen recording are desired to be extracted as key frames to efficiently represent the frames of the screen recording using a minimal number of frames. Because each key frame will be prepared as described according to some embodiments described herein, extracting a fewer number of key frames will greatly reduce the resources and time that are needed to prepare the key frames. As such, in some embodiments, the greater that the metric indicates variation, the greater number of frames will be extracted from the subset of adjacent similar frames as key frames. Similarly, the lower that the metric indicates variation, the fewer number of frames will be extracted from the subset of adjacent similar frames as key frames.

At 1008, the one or more extracted key frames are added into a set of extracted key frames corresponding to the screen recording.

At 1010, whether there is at least one more frame in the screen recording is determined. In the event that there is at least one more frame in the screen recording, control is returned to 1002. Otherwise, in the event that there are no more frames in the screen recording, process 1000 ends. Steps 1002 through 1008 repeat until all the frames of the screen recording are evaluated for key frame extraction.

Using the example task that instructs a contributor user to open the AcmeFlicks application and scroll through a watch history to show within the screen recording at least the last 20 videos/shows that the user had watched using that application, process 1000 aims to extract key frames from the screen recording that can be reconstructed to show the titles of the at least last 20 videos/shows but without featuring significant overlap between sequentially recorded key frames.

The following is a specific example of extracting key frames from a screen recording: A segment of a given frame of a screen recording is identified and the same segment is search for in adjacent frames. If the segment image matches with >95% confidence (or some other configured threshold) in the adjacent frame and the location of each (vertical position) is less than 40% (or some other configured threshold) difference, then the adjacent frame is discarded (i.e., not extracted as a key frame), or else the adjacent frame is maintained (e.g., extracted as a key frame). The thresholds mentioned above can be configured differently from one application to another. Pseudocode for implementing the specific example of extracting key frames is as follows:

```
#start with both variables pointing at the first frame
current_frame=imload(frame-0)
compare_frame=current_frame
strip=None
#always retain the first frame
retain(current_frame)
#iterate through the entire list of frames in order
while not at end of frames:
if not strip:
   strip=generate_strip(current_frame)
#move the comparison frame along
compare_frame=imload(compare_frame+1)
#do the match
max_loc, max_val=matchTemplate(strip, compare_frame)
retain_this_frame=True
#if we have a match that is good enough
if match found and max_val>0.95:
#. . . and the distance is greater than a minimum amount (e.g. 0.4)
if percentage_distance<0.4:
   #skip the frame, it's too similar
   retain_this_frame=False
if retain_this_frame:
   retain_frame(compare_frame)
   current_frame=compare_frame
   strip=None
```

Figure 11:
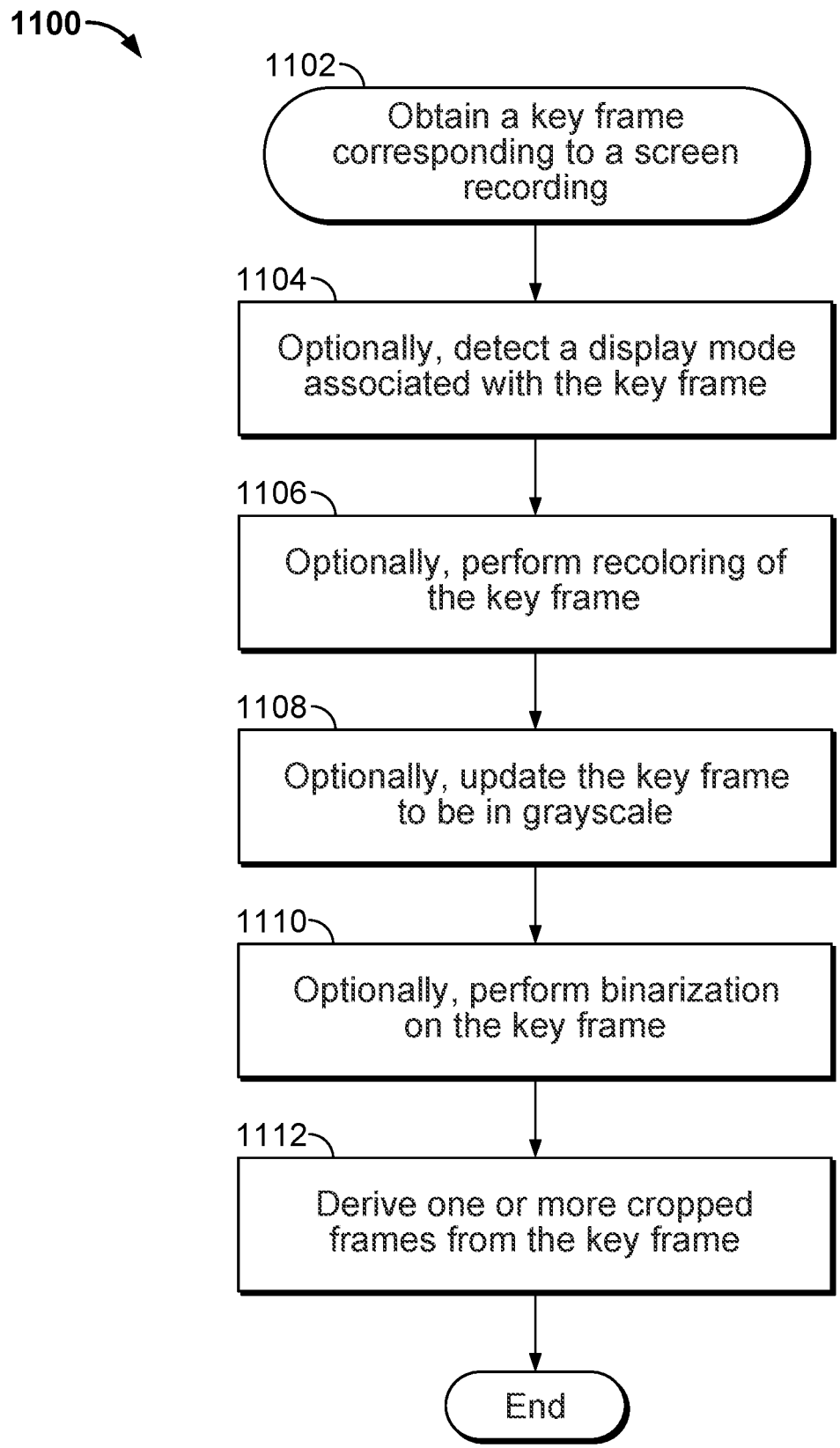
FIG. 11 is a flow diagram showing an example process for preparing a key frame that has been extracted from a screen recording.

FIG. 11 is a flow diagram showing an example process for preparing a key frame that has been extracted from a screen recording. In some embodiments, process 1100 can be implemented on a server such as screen recording processing server 106 of system 100 of FIG. 1. In some embodiments, step 906 of process 900 of FIG. 9 may be implemented, at least in part, using process 1100.

Process 1100 describes an example process by which to prepare each key frame that has been extracted from a screen recording (e.g., using a process such as process 1000 of FIG. 10). Process 1100 describes specific techniques of preparing a key frame. In some embodiments, at least some of the techniques for preparing a key frame as described in process 1100 can be performed for a key frame. Process 1100 can be performed on each key frame that is extracted from a screen recording.

As will be described below, process 1100 starts with a color key frame and then derives from that key frame a set of cropped frames, where each cropped frame comprises a piece of black text on a white background.

At 1102, a key frame corresponding to a screen recording is obtained.

At 1104, a display mode associated with the key frame is detected, optionally. In some embodiments, a "display mode" associated with a key frame refers to whether a color scheme is used to display a contrast between text and the background on which the text is presented. For example, a "light mode" is a color scheme in which darker colored text is displayed against a darker colored background and a "dark mode" is a color scheme in which lighter colored text is displayed against a lighter colored background. In some embodiments, the display mode of the key frame is detected by generating a histogram of the number of occurrences of each pixel type within the key frame. Then, the histogram is used to determine whether the key frame is in "light mode" or "dark mode." For example, if the histogram indicates that there are fewer lighter colored pixels than darker colored pixels, then the key frame is in "dark mode" and if the histogram indicates that there are more lighter colored pixels than darker colored pixels, then the key frame is in "light mode."

At 1106, recoloring of the key frame is performed, optionally. In some embodiments, zero or more portions of the key frame are recolored (e.g., the pixels thereof are changed into different colors). For example, processing rules associated with the particular task (or application) with which the screen recording is associated with are used to determine known location(s) of images or other display elements that should be recolored (e.g., to be black or whatever the background color is that is determined based on the display mode that is determined in step 1104). For example, symbols, icons, or other display elements that are known to appear in certain areas of the user interface of an application can be recolored to match the background color in the key frame. One reason to recolor certain areas of the key frame is to eliminate the portions that do not contain text that can be recognized by an OCR technique and therefore, are not relevant to the server-side validation or the generation of a set of structured data.

At 1108, the key frame is updated to be in grayscale, optionally. The processed key frame is then converted into grayscale, such that each pixel is a shade of grade that is determined based on its original value.

At 1110, binarization is performed on the key frame, optionally. The grayscale key frame is then binarized so as to appear monochromatic (e.g., include only black and white content). For example, the monochromatic key frame includes only black text displayed against a white background (after the processing steps described above).

At 1112, one or more cropped frames are derived from the key frame. Each portion/subarea of the monochromatic key frame is used to generate a cropped frame. If there are multiple portions/subareas of the monochromatic key frame that include text, then each portion/subarea is used to generate a corresponding cropped frame. In some embodiments, processing rules associated with the particular task (or application) with which the screen recording is associated with are used to determine known location(s) of a user interface that include text and therefore should be used to generate cropped frames. In some embodiments, each cropped frame that is obtained from a monochromatic key frame includes a corresponding piece of text but no images because, as will be described in FIG. 12, below, each cropped frame is to be input into an OCR process to output the corresponding text. In some embodiments, each cropped frame that is derived from a key frame is assigned a unique cropped frame identifier (e.g., that identifies the key frame from which it was derived) and also the location in the key frame from which it was generated.

Figure 12:
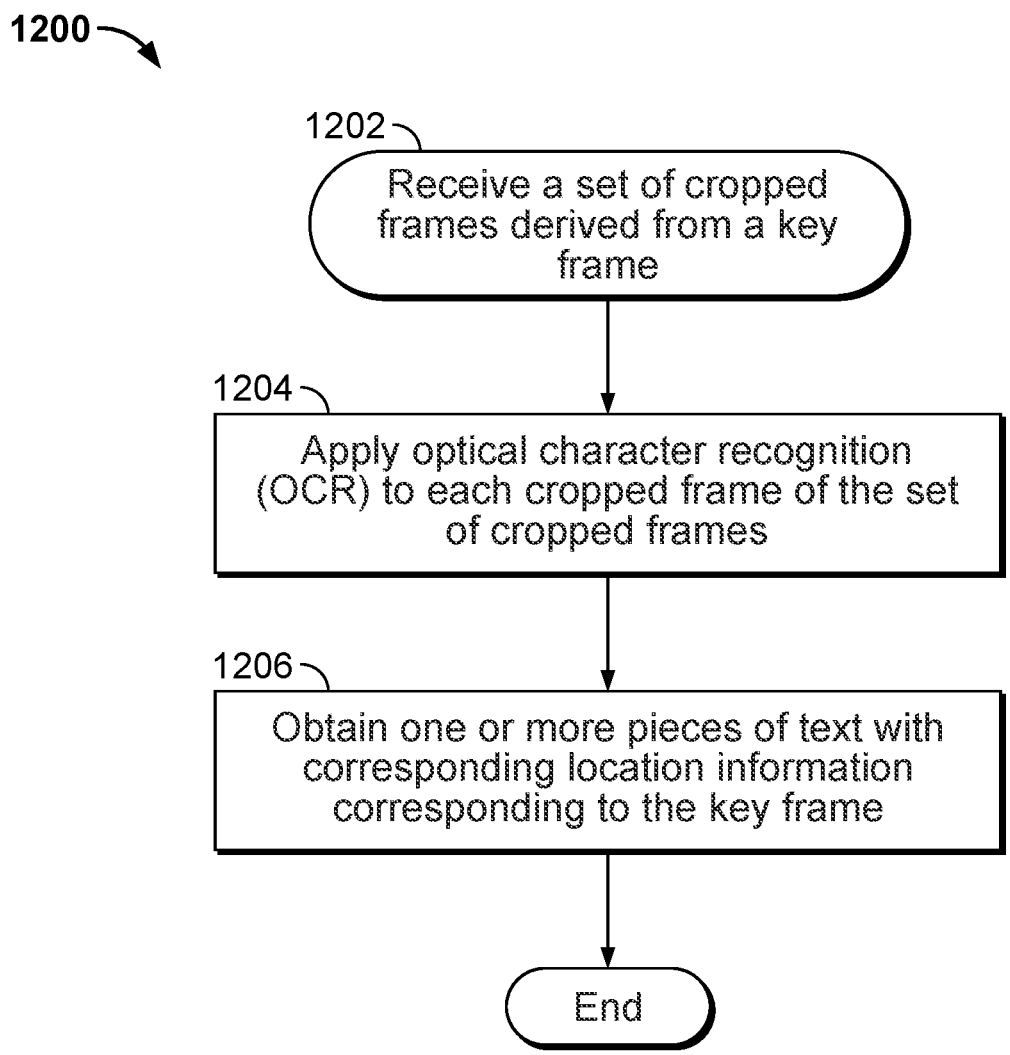
FIG. 12 is a flow diagram showing an example process for applying OCR to cropped frames derived from a key frame.

FIG. 12 is a flow diagram showing an example process for applying OCR to cropped frames derived from a key frame. In some embodiments, process 1200 can be implemented on a server such as screen recording processing server 106 of system 100 of FIG. 1. In some embodiments, step 908 of process 900 of FIG. 9 may be implemented, at least in part, using process 1200.

At 1202, a set of cropped frames derived from a key frame is received. In some embodiments, a set of cropped frames that is derived from a key frame is obtained using a process such as process 1100 of FIG. 11.

At 1204, optical character recognition (OCR) is applied to each cropped frame of the set of cropped frames. Each cropped frame that is derived from a key frame is fed into an OCR technique. In some embodiments, the OCR that is used is limited to recognize a restricted set of characters.

At 1206, one or more pieces of text with corresponding location information corresponding to the key frame are obtained. The text that is recognized from each cropped frame is associated with the location within the key frame from which the cropped frame was derived.

Figure 13:
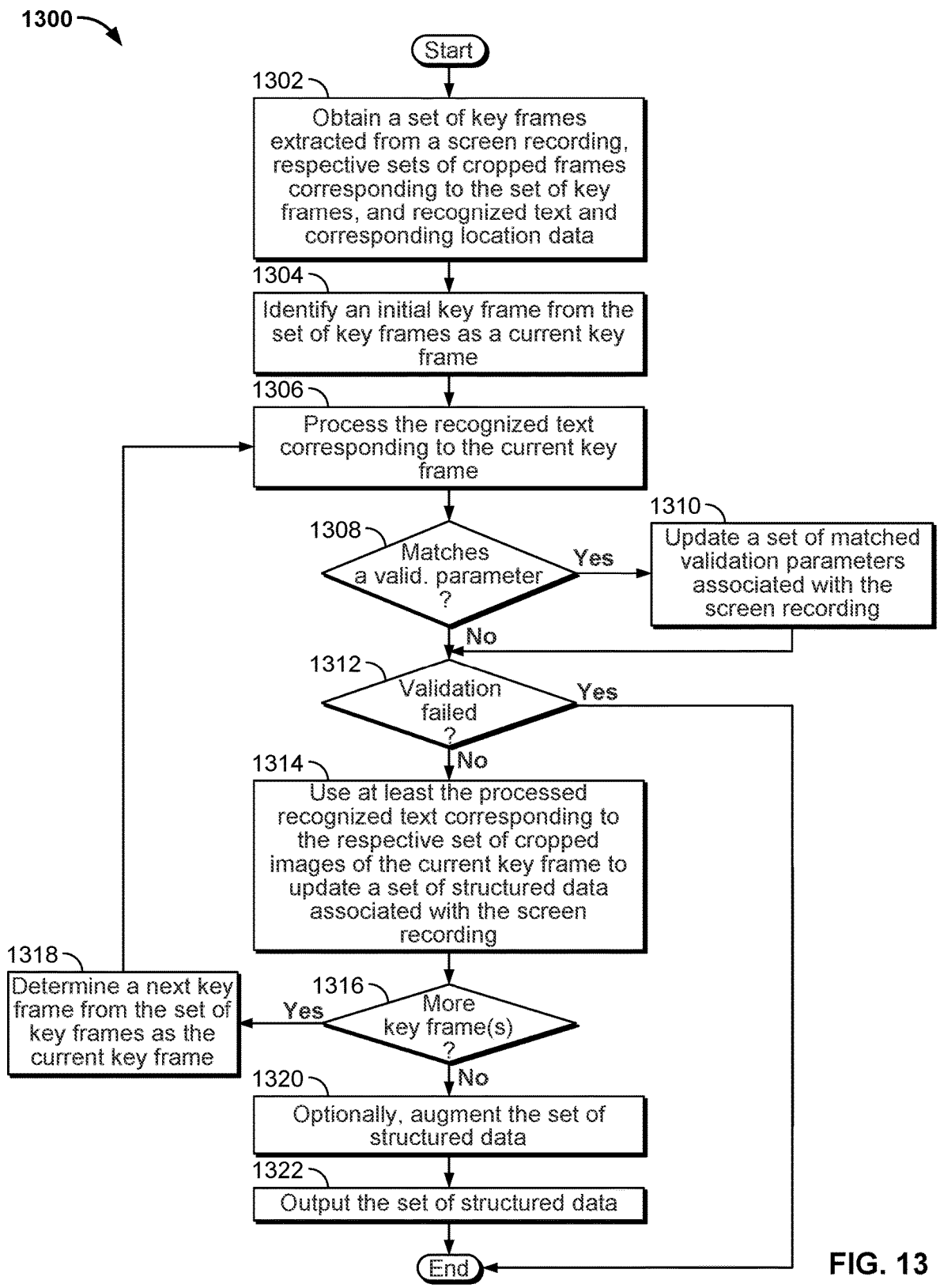
FIG. 13 is a flow diagram showing an example process for performing server-side validation on and generating a set of structured data from a screen recording.

FIG. 13 is a flow diagram showing an example process for performing server-side validation on and generating a set of structured data from a screen recording. In some embodiments, process 1300 can be implemented on a server such as screen recording processing server 106 of system 100 of FIG. 1. In some embodiments, steps 910 and 912 of process 900 of FIG. 9 may be implemented, at least in part, using process 1300.

At 1302, a set of key frames that is extracted from a screen recording, respective sets of cropped frames corresponding to the set of key frames, and recognized text and corresponding location data are obtained. For example, the set of key frames extracted from a screen recording is obtained using a process such as process 1000 of FIG. 10, the key frames' respective sets of cropped frames is obtained using a process such as process 1100 of FIG. 11, and the text recognized from the cropped frames and their location information within their respective key frames are obtained from a process such as process 1200 of FIG. 12.

At 1304, an initial key frame is identified from the set of key frames as a current key frame. In some embodiments, the initial key frame can be selected as the first key frame (within the sequence in which the key frames was recorded) that is determined to likely include the content that is requested by the task. In some embodiments, the initial key frame is a key frame that is recorded earlier than any other key frame. In some embodiments, the initial key frame that is analyzed at the server to determine video validation is determined based on a search mode that is predetermined for the task (or an application associated with the task) based on historical data of where in screen recordings the text content that is requested by the task (or an application associated with the task) tends to appear. The example search modes described in FIG. 7 for the device-side validation can also be used in the server-side validation.

At 1306, the recognized text corresponding to the current key frame is processed. In some embodiments, the text that is recognized from the set of cropped frames that have been derived from the current key frame is processed (e.g., using one or more processing rules associated with the task) to correct errors associated with the OCR's output and/or incompletely shown text within that key frame. In a first example, common errors that are made by OCR can be determined within the recognized text of the key frame and removed. In a specific example of an OCR error, an arrow or other non-character symbol can be erroneously recognized by the OCR process as a letter. As such, this erroneously recognized letter can be discarded from the recognized text. In a second example, screen edge detection can be used to identify when recognized text from a cropped frame is erroneous because it was recognized from text that was cut off by the end of the key frame and therefore only includes the upper or lower portions of a line of text. In a specific example of applying screen edge detection, the location within the key frame of a cropped frame can be used to determine that the cropped frame was cropped from either the top or bottom of the key frame and/or the nature of the way that a line of text was truncated may point to that line of text being cut off by the edge of the key frame. For example, recognized text that is truncated by a key frame's edge can be discarded (because it is assumed that a complete, not truncated version of the line of text is preserved within another key frame).

At 1308, whether the processed text matches a validation parameter is determined. In the event that the processed text matches a validation parameter, control is transferred to 1310. Otherwise, in the event that the processed text does not match a validation parameter, control is transferred to 1312. The processed text from step 1306 is compared against the server-side validation criteria to determine whether the processed text matches a validation parameter that is included in the server-side validation criteria. For example, the validation parameters can be that the screen recording includes a characteristic marker (e.g., a Boolean term) and that the screen recording shows at least a specified number of entries within a list. As such, the processed text can be checked to determine whether the processed text includes a characteristic marker and/or whether the process text includes an entry within the specified list (e.g., an entry with a list may include a sequence number, a time stamp, or any other identifying information associated with its membership within a list).

At 1310, a set of matched validation parameters associated with the screen recording is updated. When the processed text matches a validation parameter (e.g., included one of potentially multiple required characteristic markers and/or is the Nth item of at least N required items in a list) of the set of server-side validation criteria, then the set of matched validation parameters is updated to include this additionally matched validation parameter.

As shown in process 1300, step 1310 may be performed repeatedly as more validation parameters are identified from processed text associated with key frames. If the set of matched validation parameters can eventually be updated to include all the validation parameters that are included in the set of server-side validation criteria for a screen recording before process 1300 ends, then the screen recording is validated at the server and the set of structured data that is generated from the screen recording is output.

At 1312, whether a video validation of the screen recording has failed is determined. In the event that the video validation of the screen recording has failed, process 1300 ends. When the video validation of the screen recording has failed, the set of structured data, if any, that has been generated from the key frame(s) of the screen recording is not output. Otherwise, in the event that the video validation of the screen recording has not failed, control is transferred to 1314. One way to determine that the video validation of the screen recording has failed is if the current key frame were the last key frame in the set of extracted key frames and yet the set of matched validation parameters does not include all the validation parameters that are included in the set of server-side validation criteria. However, if the current key frame were not the last key frame in the set of extracted key frames, then the video validation has not failed because the remaining key frames may include the remaining validation parameters that are required by the set of server-side validation criteria.

At 1314, at least the recognized text corresponding to the respective set of cropped frames of the current key frame is used to update a set of structured data associated with the screen recording. The processed recognized text from the current key frame is used to add to the set of structured data that is generated for the screen recording. For example, the set of structured data comprises a list with a name/heading and sequence of items/entries. In a specific entry, the processed recognized text corresponding to the current key frame comprises text that comprises the name of the list that is being built, text that is associated with one or more additional entries in the list that is being built, and/or text that is associated with a subheading within the list that is being built.

In some embodiments, the processed recognized text from more than one cropped frame corresponding to the current key frame is used together to determine related text. For example, related text can comprise text that should be considered together when used to update the set of structured data (e.g., text that belongs to the same entry in a list). For example, the location information corresponding to cropped frames may indicate that the cropped frames were located close to each other in the current key frame and therefore include related text. In a specific example, a first of two cropped frames that were located close to each other in the current key frame may include text indicating a date and the second of the two cropped frames may include text indicating an activity that was performed on that date.

In some embodiments, processed recognized text corresponding to the current key frame is considered with the processed recognized text corresponding to the previous current key frame, if any, to determine whether duplicate content exists between the two key frames. For example, a fuzzy string match (a fuzzy match is used to be able to match two of the same characters that may be recognized as different characters due to an OCR error like when "I" is recognized as correctly as "I" and incorrectly as "1") is used to identify duplicate text between processed recognized text of adjacent key frames. Then, deduplication is performed on the duplicate text across the adjacent key frames by including only one instance of the duplicative text in updating the set of structured data.

In some embodiments, processed recognized text corresponding to the current key frame is considered with the images or symbols (e.g., arrows, bullet points, colored bars) that were included in the original color key frame to determine where and how to insert the processed recognized text into the set of structured data. For example, while the images and symbols of the original color key frame were ignored, recolored, or removed/cropped out during the preparation of the key frame, at least some of the images and symbols of the original color key frame can be referred to determine where in the list the processed recognized text corresponding to the current key frame should be inserted.

Through multiple passes through step 1314, additional entries to the list are added as the processed recognized text corresponding to more key frames is obtained.

In some embodiments, the set of structured data is formatted according to formatting rules associated with the task.

For the example task that instructs a contributor user to open the AcmeFlicks application and scroll through a watch history to show within the screen recording at least the last 20 videos/shows that the user had watched using that application, the resulting set of structured data can be a list of text titled "Watch history" and include at least 20 entries, each being a title of a video/show.

At 1316, whether there is at least one more key frame is determined. In the event that there is at least one more key frame to analyze, control is transferred to 1318. Otherwise, in the event that there are no more key frames to analyze, control is transferred to 1320.

At 1318, a next key frame is determined from the set of key frames as the current key frame. In some embodiments, the next key frame can be determined as the next sequentially recorded key frame in the set. In some embodiments, the next key frame is determined based on a search sequence associated with a determined search mode for the task.

At 1320, the set of structured data is optionally augmented. In some embodiments, a third-party service can be queried using items included in the set of structured data to obtain additional, supplemental information corresponding to those items. In the specific example where each item within the built list is a video/show title that was watched by the user using the AcmeFlicks application, a movie database can be queried to obtain additional information for each video/show title such as the year of its release and a synopsis of the story.

At 1322, the set of structured data is outputted. In some embodiments, the set of structured data (with or without augmentations) that is generated from the screen recording corresponding to the task is sent to another server. In some embodiments, the set of structured data (with or without augmentations) that is generated from the screen recording corresponding to the task is presented at the user interface of an administrative user. In some embodiments, the set of structured data (with or without augmentations) that is generated from the screen recording corresponding to the task is analyzed with other sets of structured data that are generated from screen recordings corresponding to the same task to determine patterns, trends, and habits associated with users.

Figure 14A:
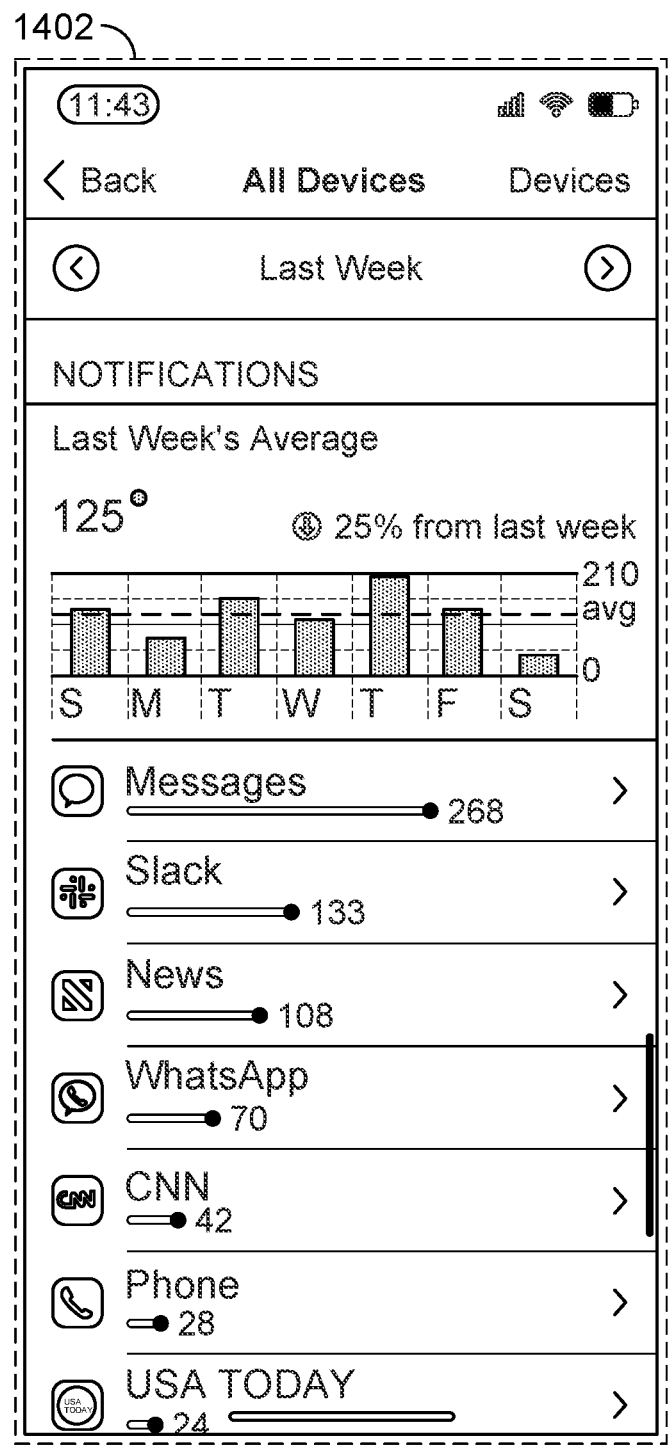
FIG. 14A shows an example key frame that has been extracted from a screen recording of a user browsing through a screen time activity tracking application.
Figure 14B:
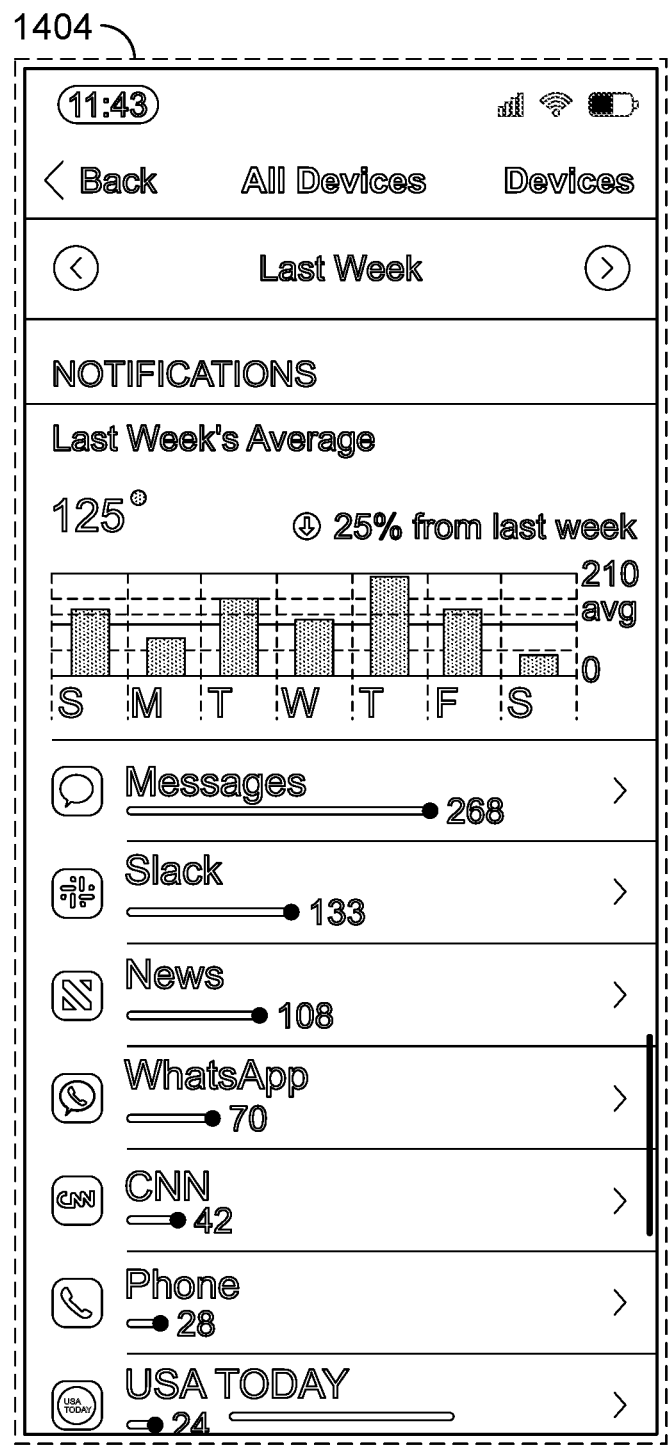
FIG. 14B shows an example key frame that has been prepared to be in grayscale.
Figure 14C:
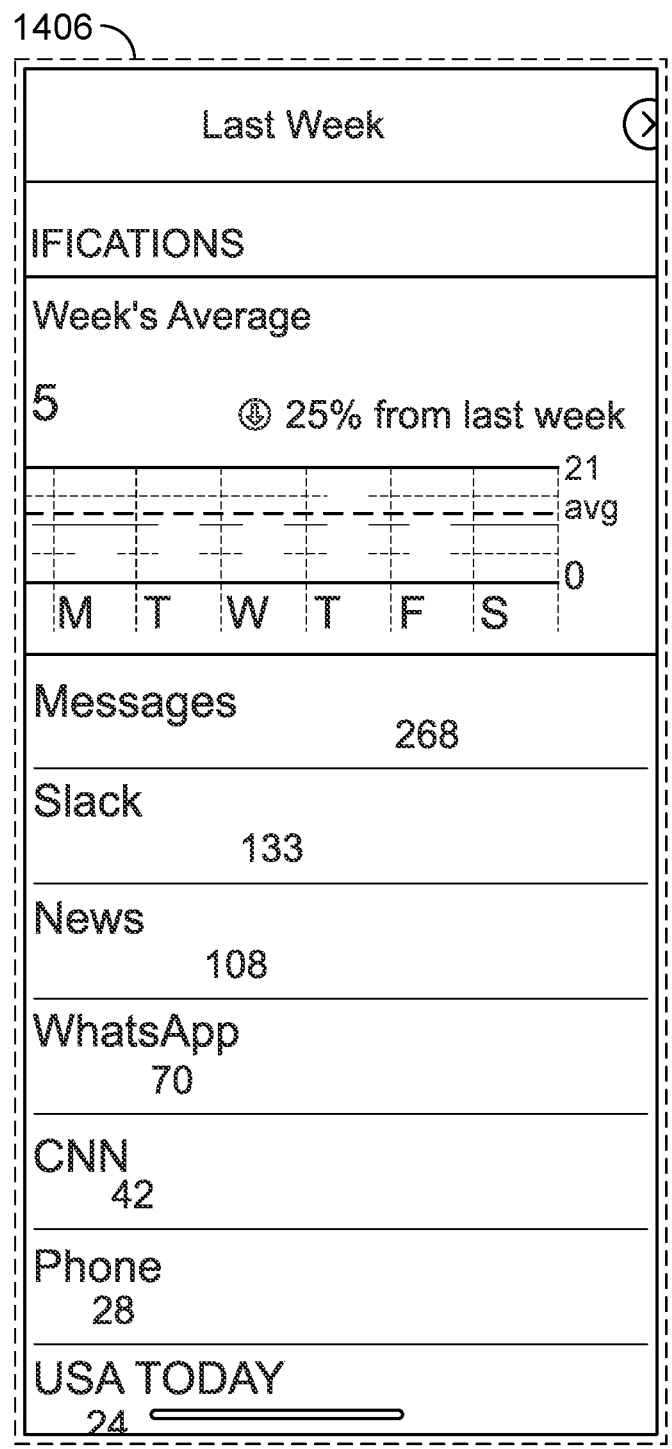
FIG. 14C shows an example key frame that has been prepared to be binarized and also cropped.

FIGS. 14A, 14B, and 14C are diagrams showing examples of a key frame extracted from a screen recording and prepared versions of that key frame.

FIG. 14A shows an example key frame that has been extracted from a screen recording of a user browsing through a screen time activity tracking application. Key frame 1402 was extracted from a screen recording using a process such as process 1000 of FIG. 10. Key frame 1402 is in full color.

FIG. 14B shows an example key frame that has been prepared to be in grayscale. The colors of key frame 1402 of FIG. 14A have been updated to be in grayscale, resulting in prepared key frame 1404, during the preparation of key frame 1402 in a process such as process 1100 of FIG. 11.

FIG. 14C shows an example key frame that has been prepared to be binarized and also cropped. The grayscale colors of prepared key frame 1404 of FIG. 14B have been binarized to be monochromatic and certain features of prepared key frame 1404 (such as the icons of the applications and their corresponding chevron/arrows) have been cropped, resulting in prepared key frame 1406, during the preparation of key frame 1402 in a process such as process 1100 of FIG. 11. For example, prepared key frame 1406 could be further processed (e.g., cropped into multiple cropped images) or directly fed into an OCR technique to recognize the text within the prepared key frame. The text will be included in the generated structured data for this screen recording.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A client device, comprising:
a processor configured to:
  access a screen recording of a user's activities on the client device with respect to a task;
  perform, at the client device, video validation on the screen recording, including to:
    determine whether a file size of the screen recording is greater than a predetermined file size corresponding to the task; and
    in response to a determination that the file size of the screen recording is greater than the predetermined file size corresponding to the task, identify a characteristic marker associated with the task within the screen recording;
  in response to the characteristic marker being identified within the screen recording:
    send at least a portion of the screen recording or a compressed version of the screen recording to a server for further processing; and
    provide a reward to an account associated with the user; and
  delete the screen recording; and
a memory coupled to the processor and configured to provide the processor with instructions.

2. The client device of claim 1, wherein the processor is further configured to:
present instructions associated with the task at the client device;
receive a user selection of the task; and
obtain the screen recording at the client device.

3. The client device of claim 1, wherein to perform the video validation on the screen recording further comprises to determine whether a time at which the screen recording was generated is within a predetermined window time since the task was selected.

4. The client device of claim 1, wherein to perform the video validation on the screen recording further comprises to:
determine a search mode corresponding to the task;
identify an initial subset of frames associated with the screen recording based on the search mode; and
determine whether the initial subset of frames includes the characteristic marker.

5. The client device of claim 4, wherein to determine whether the initial subset of frames includes the characteristic marker comprises to:
perform optical character recognition on the initial subset of frames to obtain recognized text; and
determine whether the recognized text includes the characteristic marker.

6. The client device of claim 4, wherein the search mode comprises a location within the screen recording from which to determine the initial subset of frames and a sequence of one or more other locations within the screen recording from which to determine one or more subsequent subsets of frames.

7. The client device of claim 4, wherein the processor is further configured to:
in response to a determination that the initial subset of frames does not include the characteristic marker, determine a subsequent subset of frames associated with the screen recording based on the search mode; and
determine whether the subsequent subset of frames includes the characteristic marker.

8. The client device of claim 1, wherein the characteristic marker comprises a Boolean term.

9. A method, comprising:
accessing a screen recording of a user's activities on a client device with respect to a task;
performing, at the client device, video validation on the screen recording, including by:
  determining whether a file size of the screen recording is greater than a predetermined file size corresponding to the task; and
  in response to a determination that the file size of the screen recording is greater than the predetermined file size corresponding to the task, identifying a characteristic marker associated with the task within the screen recording;
in response to the characteristic marker being identified within the screen recording:
  sending at least a portion of the screen recording or a compressed version of the screen recording to a server for further processing; and
  providing a reward to an account associated with the user; and
deleting the screen recording.

10. The method of claim 9, further comprising:
presenting instructions associated with the task at the client device;
receiving a user selection of the task; and
obtaining the screen recording at the client device.

11. The method of claim 9, wherein performing the video validation on the screen recording further comprises determining whether a time at which the screen recording was generated is within a predetermined window time since the task was selected.

12. The method of claim 9, wherein performing the video validation on the screen recording further comprises:
determining a search mode corresponding to the task;
identifying an initial subset of frames associated with the screen recording based on the search mode; and
determining whether the initial subset of frames includes the characteristic marker.

13. The method of claim 12, wherein determining whether the initial subset of frames includes the characteristic marker comprises:
performing optical character recognition on the initial subset of frames to obtain recognized text; and
determining whether the recognized text includes the characteristic marker.

14. The method of claim 12, wherein the search mode comprises a location within the screen recording from which to determine the initial subset of frames and a sequence of one or more other locations within the screen recording from which to determine one or more subsequent subsets of frames.

15. The method of claim 12, further comprising:
in response to a determination that the initial subset of frames does not include the characteristic marker, determining a subsequent subset of frames associated with the screen recording based on the search mode; and determining whether the subsequent subset of frames includes the characteristic marker.

16. A computer program product, the computer program product being embodied in a non-transitory computer-readable storage medium and comprising computer instructions executable on a processor for:
  accessing a screen recording of a user's activities on a client device with respect to a task;
  performing, at the client device, video validation on the screen recording, including by:
    determining whether a file size of the screen recording is greater than a predetermined file size corresponding to the task; and
    in response to a determination that the file size of the screen recording is greater than the predetermined file size corresponding to the task, identifying a characteristic marker associated with the task within the screen recording;
  in response to the characteristic marker being identified within the screen recording:
    sending at least a portion of the screen recording or a compressed version of the screen recording to a server for further processing; and
    providing a reward to an account associated with the user; and
  deleting the screen recording.

\* \* \* \* \*